(12) United States Patent
Arsenault et al.

(10) Patent No.: US 12,388,298 B2
(45) Date of Patent: Aug. 12, 2025

(54) METHOD OF WIRELESS POWER TRANSFER THROUGH A MEDIUM

(71) Applicant: Solace Power Inc., Mount Pearl (CA)

(72) Inventors: Paul Arsenault, Mount Pearl (CA); Mark Hickey, Mount Pearl (CA); Bernard Ryan, Mount Pearl (CA); Amir Tahavorgar, Mount Pearl (CA); Robert Cove, Mount Pearl (CA); Samer Aldhaher, Mount Pearl (CA); Si Jing Lim, Mount Pearl (CA)

(73) Assignee: Solace Power Inc., Mount Pearl (CA)

( * ) Notice: Subject to any disclaimer, the term of this patent is extended or adjusted under 35 U.S.C. 154(b) by 0 days.

(21) Appl. No.: 18/392,338

(22) Filed: Dec. 21, 2023

(65) Prior Publication Data

US 2024/0213813 A1 Jun. 27, 2024

Related U.S. Application Data

(60) Provisional application No. 63/434,531, filed on Dec. 22, 2022.

(51) Int. Cl.
*H02J 50/50* (2016.01)
*H02J 50/12* (2016.01)
*H02J 50/80* (2016.01)

(52) U.S. Cl.
CPC ............. *H02J 50/50* (2016.02); *H02J 50/12* (2016.02); *H02J 50/80* (2016.02)

(58) Field of Classification Search
CPC ............. H02J 50/50; H02J 50/80; H02J 50/12
See application file for complete search history.

(56) References Cited

U.S. PATENT DOCUMENTS

| 9,653,948 | B2 | 5/2017 | Polu et al. |
| 9,979,206 | B2 | 5/2018 | Nyberg et al. |
| 11,728,695 | B2 | 8/2023 | Aldhaher et al. |
| 11,817,834 | B2 | 11/2023 | Aldhaher |
| 2021/0281122 | A1 | 9/2021 | Aldhaher |
| 2022/0416582 | A1 | 12/2022 | Tahavorgar |

FOREIGN PATENT DOCUMENTS

CN 115498778 A 12/2022

OTHER PUBLICATIONS

Kuroda, G. et al. "Stabilization of Power Receiving Coil Voltage by Feedback on Wireless Power Transfer to Small Mobile Robot", Journal of the Japan Society of Applied Electromagnetics and Mechanics 29.1 (2021): 7-12.
International Search Report and Written Opinion for PCT/CA2023/051723 dated Feb. 13, 2024.

*Primary Examiner* — Robert L Deberadinis
(74) *Attorney, Agent, or Firm* — Harness, Dickey & Pierce, P.L.C.

(57) ABSTRACT

There is provided a method of wireless power transfer through a medium. The method comprises controlling an input voltage of an inverter of a transmitter of a wireless power transfer system based on a detected parameter. The method further comprises generating, via the transmitter, a field for transferring power wirelessly through a medium to a receiver of the wireless power transfer system based on the input voltage. Other methods are also provided. There is also provided a controller, system, and transmitter for wirelessly transferring power through a medium.

20 Claims, 21 Drawing Sheets

METHOD OF WIRELESS POWER TRANSFER THROUGH A MEDIUM

CROSS-REFERENCE TO RELATED APPLICATIONS

This application claims the benefit of U.S. Provisional Application No. 63/434,531 filed on 22 Dec. 2022, and titled METHOD OF WIRELESS POWER TRANSFER THROUGH A MEDIUM, the entirety of which is incorporated herein by reference.

TECHNICAL FIELD

The present disclosure relates generally to wireless power transfer, and in particular, to methods of wireless power transfer through a medium, and controllers for wirelessly transferring power through a medium.

BACKGROUND

Wireless power transfer systems such as wireless charging are becoming an increasingly important technology to enable the next generation of devices. The potential benefits and advantages offered by the technology is evident by the increasing number of manufacturers and companies investing in the technology.

A variety of wireless power transfer systems are known. A typical wireless power transfer system includes a power source electrically connected to a wireless power transmitter, and a wireless power receiver electrically connected to a load.

In magnetic induction systems, the transmitter has a transmitter coil with a certain inductance that transfers electrical energy from the power source to the receiver, which has a receiver coil with a certain inductance. Power transfer occurs due to coupling of magnetic fields between the coils or inductors of the transmitter and receiver. The range of these magnetic induction systems is limited, and the coils or inductors of the transmitter and receiver must be tightly coupled, i.e., have a coupling factor above 0.5 and be in optimal alignment for efficient power transfer.

There also exists resonant magnetic systems in which power is transferred due to coupling of magnetic fields between the coils or inductors of the transmitter and receiver. The transmitter and receiver inductors may be loosely coupled, i.e., have a coupling factor below 0.5. However, in resonant magnetic systems the inductors are resonated using at least one capacitor. Furthermore, in resonant magnetic systems, the transmitter is self-resonant and the receiver is self-resonant. The range of power transfer in resonant magnetic systems is increased over that of magnetic induction systems and alignment issues are rectified. While electromagnetic energy is produced in magnetic induction and resonant magnetic systems, the majority of power transfer occurs via the magnetic field. Little, if any, power is transferred via electric induction or resonant electric induction.

In electrical capacitive systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. The inductor may be a coil. In resonant electric systems, the transmitter is self-resonant, and the receiver is self-resonant. Resonant electric systems have an increased range of power transfer compared to that of electric induction systems and alignment issues are rectified. While electromagnetic energy is produced in electric induction and resonant electric systems, the majority of power transfer occurs via the electric field. Little, if any, power is transferred via magnetic induction or resonant magnetic induction.

While some wireless power transfer systems are known, improvements and/or alternatives are desired.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the disclosure may or may not address one or more of the background issues.

SUMMARY

According to an aspect of the disclosure there is provided methods, controllers, transmitter and wireless power transfer systems of/for wireless power transfer through a medium.

A medium may be between a transmitter and a receiver of a wireless power system. The medium may be, at least partially, in the form of an air-gap, or may at least partially be a physical medium such as glass, wood, concrete or other building supply. The wireless power transfer system may be tuned for a particular medium, e.g., a thickness of the medium or a material property of the medium. Altering a characteristic of the medium, e.g., the thickness, or changing the medium entirely, e.g., other materials being introduced in the space between transmitter and receiver may result in sub-optimal wireless power transfer between transmitter and receiver. The tuning of the system may be sub-optimal for the new altered medium or new medium characteristic or parameter. As a result, power transfer from the transmitter to the receiver may be sub-optimal, e.g., reduced average power transfer efficiency. Adjusting wireless power transfer in view of changes to the medium may accordingly improve average power transfer efficiency. The described methods, controllers, transmitter, and wireless power transfer systems may provide for such improved average power transfer efficiency.

According to another aspect of the disclosure there is provided a method of wireless power transfer through a medium, the method comprising:
  controlling an input voltage of an inverter of a transmitter of a wireless power transfer system based on a detected parameter.

The transmitter and receiver may be separated by the medium. The transmitter of a wireless power transfer system may generate a field, e.g., electric and/or magnetic field, which is, at least partially, within the medium. The field may be for transferring power wirelessly to the receiver.

Major surfaces of transmitter and receiver elements of the transmitter and receiver, respectively, may be aligned. The major surfaces may form parallel planes. The major surfaces may be proximate the medium.

The transmitter and/or receiver may be affixed to opposing surfaces which define the medium. For example, the transmitter and/or receiver may be affixed to opposite outer and inner surfaces of a building structure formed of wood, concrete, glass, etc. The transmitter and/or receiver may be affixed to opposite sides of a window, e.g., a glass window.

The controlling may be performed by a controller. The controller may comprise a microcontroller (MCU). The controller may form part of the transmitter or be proximate to the transmitter.

The method may further comprise:
generating, via a transmit resonator of the transmitter, the transmit resonator electrically connected to the inverter, a field for transferring power wirelessly through a medium to a receiver of the wireless power transfer system.

The generated field may be based on the input voltage. A strength of the generated field may be based on the input voltage.

The method may further comprise:
detecting the parameter at the transmitter and/or the receiver of the wireless power transfer system. The parameter may be detected at the transmitter resonator and/or receiver resonator of the transmitter and receiver, respectively. The parameter may be detected at a rectifier element of the receiver. The parameter may be detected at an output of the rectifier element. The rectifier element may comprise a diode rectifier.

The parameter may comprise rectified voltage at the receiver of the wireless power transfer system. The rectified voltage may be at a receiver resonator of the receiver. The rectified voltage may be rectified power signal extracted from a field generated by the transmitter. The parameter may comprise a ratio of the detected rectified voltage and a voltage input into the receiver, i.e., an input voltage. The parameter may comprise a change in a detected rectified voltage at the receiver of the wireless power transfer system over time.

Controlling an input voltage of an inverter may comprise:
controlling an output voltage of a converter electrically connected to the inverter. The converter may be a DC/DC converter of the transmitter. The DC/DC converter may be electrically connected to the inverter such that an output voltage of the DC/DC converter is an input voltage of the inverter. The DC/DC converter may be for adjusting a voltage level of a power signal input to the inverter. The DC/DC converter may receive a power signal from a power source and convert the power signal to an appropriate voltage for the inverter.

The transmitter may further comprise a transmitter resonator electrically connected to the inverter. The transmitter resonator may generate a field, e.g., magnetic or electric field, for transferring power to a receiver of a wireless power system. The transmitter resonator may comprise a transmitter element. The transmitter element may comprise a capacitive electrode and/or an inductor or inductive coil.

The method may further comprise:
communicating the detected parameter to the transmitter.
Communicating may comprise:
communicating the detected parameter from the receiver to the transmitter.
Communicating may comprise communicating via Bluetooth, Wi-Fi, 5G, or other suitable communication protocol.
Communicating may comprise:
modifying operation of a rectifier of a receiver of a wireless power transfer system;
detecting a parameter change at a transmitter of the wireless power transfer system based on a modification of the operation of the rectifier; and
determining data communicated from the receiver to the transmitter based on the parameter change. The data may comprise the detected parameter.

The rectifier may comprise a diode rectifier. The diode rectifier may comprise a full-bridge diode rectifier.

Modifying operation of the rectifier may comprise:
toggling operation of an electrical component at an input or an output of the rectifier. The electrical component may comprise a resistor or a capacitor. Toggling operation may comprise toggling operation of a resistor at the output of the rectifier, e.g., diode rectifier, and/or toggling operation of a capacitor at the input of the rectifier, e.g., diode rectifier. Toggling operation may comprise controlling a switching element electrically connected to the electrical component. The switching element may comprise a FET, e.g., a MOSFET. A controller at the receiver may toggle operation of the electrical component.

Communicating may comprise:
modifying operation of a synchronous rectifier of a receiver of a wireless power transfer system;
detecting a parameter change at a transmitter of the wireless power transfer system based on a modification of the operation of the synchronous rectifier; and
determining data communicated from the receiver to the transmitter based on the parameter change. The data may comprise the detected parameter.

Modifying operation of the synchronous rectifier may result in a detectable parameter change at the transmitter. Detection of this change in the parameter at the transmitter may be used to determine data communicated from the receiver to the transmitter. Communicating data from the receiver to the transmitter based on modifying operation of the synchronous rectifier may be more power efficient and allow for greater throughput than conventional communication methods.

Modifying operation of the synchronous rectifier may comprise:
toggling the synchronous rectifier between synchronous operation and non-synchronous operation.

Modifying operation of the synchronous rectifier may comprise:
selectively enabling and disabling the synchronous rectifier.

Selectively enabling and disabling the synchronous rectifier may comprises enabling and disabling synchronous operation of the synchronous rectifier. Modifying operation of the synchronous rectifier may comprise toggling operation of the synchronous operation. The time between selectively enabling/disabling or toggling operation may be altered to communicate data from the receiver to the transmitter.

Selectively enabling and disabling the synchronous rectifier may comprise selectively enabling and disabling a portion of the synchronous rectifier. Further, selectively enabling and disabling the synchronous rectifier may comprise enabling and/or disabling one side of synchronous rectifier in a push-pull configuration.

The synchronous rectifier may comprise a two-phase system, or have a push-pull configuration. One side (or phase) of the synchronous rectifier can be synchronous while the other side may be non-synchronous.

Selectively enabling and disabling the synchronous rectifier may comprise selectively enabling and disabling one side (or phase) of the synchronous rectifier.

The synchronous rectifier may comprise at least one field effect transistor (FET).

The synchronous rectifier may comprise at least one of the following:
a rectifier element for rectifying a power signal to DC;
a trigger circuit; and
a gate driver electrically connected to the trigger circuit and the rectifier element.

The gate driver may be for controlling operation of the rectifier element via a trigger signal output by the trigger circuit. The gate driver may output a gate drive voltage or gate signal which is in phase with an input voltage received at the rectifier element.

The trigger circuit may ensure proper timing of a gate drive voltage or gate signal output by the gate driver.

The rectifier element may comprise an amplifier. The rectifier element may comprise a FET. The rectifier element may comprise a load-independent class E rectifier. The class E rectifier design may be adapted for converting an input radio frequency (RF) power signal to DC. The operating or switching frequencies of the rectifier element may be, for example, 13.56 MHz and 27.12 MHz.

The gate driver may output a gate drive voltage or gate signal to control
operation of the rectifier element. Specifically, the gate signal may control operation of the amplifier by controlling operation of the FET.

The trigger circuit may comprise:
a sampling circuit for sampling the input signal.
The sampling circuit may be a voltage divider.
The trigger circuit may comprise:
a delay line for delaying output of the sampling circuit such that a gate signal is synchronized with the input signal received at the drain element.
The trigger circuit may comprise:
a comparator for generating a clock signal by comparing a delayed signal output by the delay line to a DC voltage level.
The trigger circuit may comprise:
a RC delay circuit for delaying output of the sampling circuit such that the gate signal is synchronized with the input signal received at the drain element.
The RC delay circuit may comprise at least one resistor electrically connected to at least one capacitor.
The trigger circuit may comprise:
a comparator for generating a clock signal by comparing a delayed signal output by the RC delay circuit to a DC voltage level.

The synchronous rectifier may further comprise an auxiliary DC/DC converter for powering at least one of the trigger circuit and gate driver. In other words, the synchronous rectifier may comprise a power source for powering at least one of the trigger circuit and the gate driver. The power source may be powered by power received at the receiver, e.g., power received from the transmitter via wireless power transfer.

The auxiliary DC/DC converter may be electrically connected to a low-dropout (LDO) regulator.

Modifying operation of the synchronous rectifier may comprise:
controlling operation of at least one of the trigger circuits, gate drivers and auxiliary DC/DC converters. Modifying operation of the synchronous rectifier may comprise controlling operation of all of the trigger circuit, gate drive and auxiliary DC/DC converter.
Controlling operation of the trigger circuit may comprise:
controlling operation of a comparator of the trigger circuit. Controlling operation of the comparator may comprise selectively enabling and disabling the comparator. The comparator may comprise a comparator circuit. The comparator may comprise an enable pin. Controlling operation of the trigger circuit may comprise selectively enabling the comparator via the enable pin.

Controlling operation of the auxiliary DC/DC converter may comprise:
selectively enabling and disabling operation of the auxiliary DC/DC converter to selectively power the trigger circuit and the gate driver. Selectively enabling/disabling the auxiliary DC/DC converter may comprise controlling power supplied to the auxiliary DC/DC converter. The auxiliary DC/DC converter may comprise an enable pin. Selectively enabling the auxiliary DC/DC converter may comprise selectively enabling the auxiliary DC/DC converter via the enable pin.

Detecting the parameter change may comprise:
detecting a voltage or current waveform at the transmitter. The voltage or current waveform may be detected at certain nodes of the transmitter. The voltage waveform may be detected at an output stage of the transmitter. The current waveform may be detected at an input of an inverter of the transmitter.

Determining data communicated may comprise:
processing the detected voltage or current waveform to determine communicated data.

Processing the detected voltage or current waveform may comprise:
filtering the voltage or current waveform; and
generating logic levels based on the filtered voltage or current waveform; and
decoding data based on the generated logic levels.

The logic levels may reflect variations in the voltage or current waveforms. For example, a change from a high voltage to a low voltage may represent a data transfer of 1 to 0, and a change from a low voltage to a high voltage may represent a data transfer of 0 to 1.

Decoding data comprises:
determining time intervals between the logic levels; and
decoding data based on the time intervals.

The method may further comprise:
monitoring the parameter over a period of time.

Controlling an input voltage of an inverter may comprise:
controlling an input voltage of an inverter based on a change to the monitored parameter over the period of time.

The medium may comprise:
a building structure, building materials such as wood and concrete, a wall, a door, air, plastic, water, polymers and a window. The window may be made of glass. The transmitter and receiver may be positioned on opposite sides of the medium. The medium may separate the transmitter and receiver such that the medium defines a volume between the transmitter and receiver.

According to another aspect there is provided a method of wireless power transfer through a medium. The method may comprise powering, via an inverter, a transmitter resonator of a transmitter of a wireless power transfer system at an input voltage via an inverter to generate a field for transferring power wirelessly through a medium to a receiver of the wireless power transfer system; and optimising the input voltage of the inverter based on a detected parameter.

The field may comprise a magnetic field and/or electric field.

According to another aspect there is provided a method of optimising power transfer from a transmitter to a receiver of a wireless power transfer system through a medium. The method may comprise: optimising an input voltage of an inverter of a transmitter of a wireless power transfer system based on a detected parameter.

Optimising the input voltage may optimise average power transfer efficiency between the transmitter and receiver of the wireless power transfer system.

Optimising the input voltage may comprise adjusting the input voltage from a first voltage level to a second voltage level based on the detected parameter.

Adjusting the input voltage may comprise continuously adjusting the input voltage between a plurality of voltage levels.

The methods of optimising may further comprise:
detecting the parameter at the transmitter and/or the receiver of the wireless power transfer system. The parameter may be detected at the transmitter resonator and/or receiver resonator of the transmitter and receiver, respectively. The parameter may be detected at a rectifier element of the receiver. The parameter may be detected at an output of the rectifier element. The rectifier element may comprise a diode rectifier.

The parameter may comprise rectified voltage at the receiver of the wireless power transfer system. The rectified voltage may be rectified power signal extracted from a field generated by the transmitter.

The method may further comprise:
communicating, from the receiver, the rectified voltage to the transmitter.

Communicating may comprise:
communicating the detected parameter from the receiver to the transmitter.

Communicating may comprise communicating via Bluetooth, Wi-Fi, 5G, or other suitable communication protocol. Communicating may comprise:
modifying operation of a rectifier of a receiver of a wireless power transfer system;
detecting a parameter change at a transmitter of the wireless power transfer system based on a modification of the operation of the rectifier; and
determining data communicated from the receiver to the transmitter based on the parameter change. The data may comprise the detected parameter.

The rectifier may comprise a diode rectifier. The diode rectifier may comprise a full-bridge diode rectifier.

Modifying operation of the rectifier may comprise:
toggling operation of an electrical component at an input or an output of the rectifier. The electrical component may comprise a resistor or a capacitor. Toggling operation may comprise toggling operation of a resistor at the output of the rectifier, e.g., diode rectifier, and/or toggling operation of a capacitor at the input of the rectifier, e.g., diode rectifier. Toggling operation may comprise controlling a switching element electrically connected to the electrical component. The switching element may comprise a FET, e.g., a MOSFET. A controller at the receiver may toggle operation of the electrical component.

Communicating may comprise:
modifying operation of a synchronous rectifier of a receiver of a wireless power transfer system;
detecting a parameter change at a transmitter of the wireless power transfer system based on a modification of the operation of the synchronous rectifier; and
determining data communicated from the receiver to the transmitter based on the parameter change. The data may comprise the detected parameter.

The described wireless power transfer system may be a high frequency wireless power system such as described in applicant's U.S. Provisional application Ser. No. 17/018,328, a resonant capacitively coupled wireless power transfer system as described in applicant's own U.S. Pat. No. 9,653,948B2, or a bidirectional wireless power transfer system as described in applicant's own U.S. patent application Ser. No. 17/899,711, the relevant portions of which are incorporated herein.

Modifying operation of the synchronous rectifier may result in a detectable parameter change at the transmitter. Detection of this change in the parameter at the transmitter may be used to determine data communicated from the receiver to the transmitter. Communicating data from the receiver to the transmitter based on modifying operation of the synchronous rectifier may be more power efficient and allow for greater throughput than conventional communication methods.

Modifying operation of the synchronous rectifier may comprise:
toggling the synchronous rectifier between synchronous operation and non-synchronous operation.

Modifying operation of the synchronous rectifier may comprise:
selectively enabling and disabling the synchronous rectifier.

Selectively enabling and disabling the synchronous rectifier may comprises enabling and disabling synchronous operation of the synchronous rectifier. Modifying operation of the synchronous rectifier may comprise toggling operation of the synchronous operation. The time between selectively enabling/disabling or toggling operation may be altered to communicate data from the receiver to the transmitter.

Selectively enabling and disabling the synchronous rectifier may comprise selectively enabling and disabling a portion of the synchronous rectifier. Further, selectively enabling and disabling the synchronous rectifier may comprise enabling and/or disabling one side of synchronous rectifier in a push-pull configuration.

The synchronous rectifier may comprise a two-phase system or have a push-pull configuration. One side (or phase) of the synchronous rectifier can be synchronous while the other side may be non-synchronous.

Selectively enabling and disabling the synchronous rectifier may comprise selectively enabling and disabling one side (or phase) of the synchronous rectifier.

The synchronous rectifier may comprise at least one field effect transistor (FET).

The synchronous rectifier may comprise at least one of the following:
a rectifier element for rectifying a power signal to DC;
a trigger circuit; and
a gate driver electrically connected to the trigger circuit and the rectifier element.

The gate driver may be for controlling operation of the rectifier element via a trigger signal output by the trigger circuit. The gate driver may output a gate drive voltage or gate signal which is in phase with an input voltage received at the rectifier element.

The trigger circuit may ensure proper timing of a gate drive voltage or gate signal output by the gate driver.

The rectifier element may comprise an amplifier. The rectifier element may comprise a FET. The rectifier element may comprise a load-independent class E rectifier. The class E rectifier design may be adapted for converting an input radio frequency (RF) power signal to DC. The operating or switching frequencies of the rectifier element may be, for example, 13.56 MHz and 27.12 MHz.

The gate driver may output a gate drive voltage or gate signal to control operation of the rectifier element. Specifically, the gate signal may control operation of the amplifier by controlling operation of the FET.

The trigger circuit may comprise:
a sampling circuit for sampling the input signal.
The sampling circuit may be a voltage divider.
The trigger circuit may comprise:
a delay line for delaying output of the sampling circuit such that a gate signal is synchronized with the input signal received at the drain element.
The trigger circuit may comprise:
a comparator for generating a clock signal by comparing a delayed signal output by the delay line to a DC voltage level.
The trigger circuit may comprise:
a RC delay circuit for delaying output of the sampling circuit such that the gate signal is synchronized with the input signal received at the drain element.

The RC delay circuit may comprise at least one resistor electrically connected to at least one capacitor.

The trigger circuit may comprise:
a comparator for generating a clock signal by comparing a delayed signal output by the RC delay circuit to a DC voltage level.

The synchronous rectifier may further comprise an auxiliary DC/DC converter for powering at least one of the trigger circuit and gate driver. In other words, the synchronous rectifier may comprise a power source for powering at least one of the trigger circuit and the gate driver. The power source may be powered by power received at the receiver, e.g., power received from the transmitter via wireless power transfer.

The auxiliary DC/DC converter may be electrically connected to a low-dropout (LDO) regulator.

Modifying operation of the synchronous rectifier may comprise:
controlling operation of at least one of the trigger circuits, gate drivers and auxiliary DC/DC converters. Modifying operation of the synchronous rectifier may comprise controlling operation of all of the trigger circuit, gate drive and auxiliary DC/DC converter.

Controlling operation of the trigger circuit may comprise:
controlling operation of a comparator of the trigger circuit. Controlling operation of the comparator may comprise selectively enabling and disabling the comparator. The comparator may comprise a comparator circuit. The comparator may comprise an enable pin. Controlling operation of the trigger circuit may comprise selectively enabling the comparator via the enable pin.

Controlling operation of the auxiliary DC/DC converter may comprise:
selectively enabling and disabling operation of the auxiliary DC/DC converter to selectively power the trigger circuit and the gate driver. Selectively enabling/disabling the auxiliary DC/DC converter may comprise controlling power supplied to the auxiliary DC/DC converter. The auxiliary DC/DC converter may comprise an enable pin. Selectively enabling the auxiliary DC/DC converter may comprise selectively enabling the auxiliary DC/DC converter via the enable pin.

Detecting the parameter change may comprise:
detecting a voltage or current waveform at the transmitter.
The voltage or current waveform may be detected at certain nodes of the transmitter. The voltage waveform may be detected at an output stage of the transmitter. The current waveform may be detected at an input of an inverter of the transmitter.

Determining data communicated may comprise:
processing the detected voltage or current waveform to determine communicated data.

Processing the detected voltage or current waveform may comprise:
filtering the voltage or current waveform; and
generating logic levels based on the filtered voltage or current waveform; and
decoding data based on the generated logic levels.

The logic levels may reflect variations in the voltage or current waveforms. For example, a change from a high voltage to a low voltage may represent a data transfer of 1 to 0, and a change from a low voltage to a high voltage may represent a data transfer of 0 to 1.

Decoding data comprises:
determining time intervals between the logic levels; and
decoding data based on the time intervals.

According to a further aspect there is provided method of detecting a medium between a transmitter of a wireless power transfer system and a receiver of the wireless power transfer system, the receiver for extracting power from a field generated by the transmitter.

The method may comprise:
detecting a parameter at a transmitter of a wireless power transfer system and/or a receiver of the wireless power transfer system; and
detecting a medium between the transmitter and receiver based on the parameter.

The medium may comprise:
a building structure, building materials such as wood and concrete, a wall, a door, air, plastic, water, polymers and a window. The window may be made of glass. The transmitter and receiver may be positioned on opposite sides of the medium. The medium may separate the transmitter and receiver such that the medium defines a volume between the transmitter and receiver.

The parameter may comprise rectified voltage at the receiver of the wireless power transfer system. The rectified voltage may be at a receiver resonator of the receiver. The rectified voltage may be rectified power signal extracted from a field generated by the transmitter.

The parameter may comprise reactance at the receiver of the wireless power transfer system. The reactance may be at a receiver resonator of the receiver. The parameter may comprise a phase of an impedance at the receiver. In particular, the parameter may comprise a phase of an impedance at a receiver resonator or receiver element of the receiver. The phase of the impedance may be a phase angle. The phase angle may be related to the reactance in that a large phase angle, e.g., a phase angle which exceeds a predetermined threshold, may indicate a large reactance. Similarly, a small phase angle, e.g., a phase angle which is less than a predetermined threshold, may indicate a small reactance.

The parameter may comprise the power received at the receiver. The power received at the receiver may comprise the power to a load electrically connected (potentially indirectly) to a receiver element, or the power output by the rectifier element at the receiver.

The parameter may comprise temperature data, e.g., a temperature of the receiver element, receiver resonator, or rectifier element. The method may further comprise controlling an output voltage of the transmitter converter, e.g., a DC/DC converter, based on the detected temperature data. Controlling may comprise lowering or increasing the output voltage based on the temperature data. For example, if the temperature data indicates the temperature of certain receiver elements, e.g., the rectifier element, is above a threshold, the output voltage may be lowered. This may lower the temperature at the receiver elements.

The parameter may comprise a magnitude of an impedance at a receiver resonator or receiver element of the receiver.

One of skill in the art will appreciate that multiple parameters may be detected. For example, any combination of the above-described parameters (reactance, rectified voltage, phase and impedance magnitude) may be detected. The detection of the medium may be based on one or more of the detected parameters.

Detecting a medium may comprise detecting presence of metal between the transmitter and receiver.

Detecting a medium may comprise detecting a medium between the transmitter and receiver based on the parameter reaching a threshold level. The threshold level may be indicative of a particular medium. For example, a threshold between a known range may indicate the presence of a metal between the transmitter and receiver.

According to another aspect there is provided a controller configured to control at least one of an inverter of a transmitter of a wireless power transfer system, a converter of the transmitter, the transmitter and a receiver of the wireless power transfer system to perform any of the described methods.

According to another aspect there is provided a controller for wirelessly transferring power through a medium according to any of the described methods.

The described controller may comprise an MCU.

The converter may comprise a DC/DC converter.

The described controllers may be further for communicating a signal between a receiver of a wireless power transfer system and a transmitter of the wireless power transfer system, the receiver comprising a synchronous rectifier.

The controller may be adapted to modify operation of the synchronous rectifier to alter a parameter detectable at the transmitter.

The controller may be adapted to toggle the synchronous rectifier between synchronous operation and non-synchronous operation.

The controller may be adapted to selectively enable and disable the synchronous rectifier.

Selectively enabling and disabling the synchronous rectifier may comprise enabling and disabling synchronous operation of the synchronous rectifier. Modifying operation of the synchronous rectifier may comprise toggling operation of the synchronous operation. The time between selectively enabling/disabling or toggling operation may be altered to communicate data from the receiver to the transmitter.

The controller may be electrically connected to the synchronous rectifier.

The controller may be electrically connected to at least one of:
a trigger circuit of the synchronous rectifier; and
a gate driver of the synchronous rectifier, the gate driver electrically connected to the trigger circuit and a rectifier element of the synchronous rectifier.

The controller may be adapted to control operation of a comparator of the trigger circuit. Controlling operation of the comparator may comprise selectively enabling power to the comparator. The comparator may comprise a comparator circuit.

The controller may be electrically connected to:
an auxiliary DC/DC converter of the synchronous rectifier, the auxiliary DC/DC converter for powering at least one of the trigger circuit and gate driver.

The controller may be adapted to selectively enable and disable operation of the auxiliary DC/DC converter to selectively power at least one of the trigger circuit and the gate driver. Selectively enabling/disabling the auxiliary DC/DC converter may comprise controlling power supplied to the auxiliary DC/DC converter.

The controller may further comprise a power source for supplying power to the controller. The power source may supply power to at least one of the trigger circuit and the gate driver. The power source may be powered by power received at the receiver, e.g., power received from the transmitter via wireless power transfer.

The power source may comprise an auxiliary DC/DC converter.

The controller may be supplied power by a LDO regulator.

According to another aspect there is provided a method of wireless power transfer through a medium. The medium may be between a transmitter and a receiver of a wireless power transfer system. The transmitter may generate a field which is at least partially within the medium. The receiver may extract power from the generated field. The transmitter and receiver may be separated by the medium in that the transmitter and receiver are on opposite sides of the medium.

The method may comprise:
detecting a parameter at a receiver of the wireless power transfer system;
communicating the detected parameter to a transmitter of the wireless power transfer system;
controlling an input voltage of an inverter of the transmitter based on the detected parameter; and
generating a field for transferring power wirelessly through a medium to a receiver of the wireless power transfer system.

The detecting may comprise detecting via a voltage detector of a receiver of a wireless power transfer system.

The parameter may comprise rectified voltage at the receiver. The parameter may comprise rectified voltage an output of a rectifier element of the receiver. The rectifier element may comprise an amplifier. The rectifier element may comprise a field effect transistor (FET). The rectifier element may comprise a load-independent class E rectifier. The class E rectifier design may be adapted for converting an input radio frequency (RF) power signal to DC. The operating or switching frequencies of the rectifier element may be, for example, 13.56 MHz and 27.12 MHz.

Communicating may comprise communicating via a controller of the receiver. The controller may comprise one or more MCUs.

Controlling may comprise controlling via a controller of the transmitter. The controller may comprise one more MCUs. The controlling may comprise controlling an output voltage of a converter electrically connected to the inverter. The converter may comprise a DC/DC converter. The DC/DC converter may be for converting a received DC voltage signal to a desired voltage level. The received DC voltage may be from a power supply of the transmitter.

The generating may comprise generating via a transmit resonator of the transmitter. The transmit resonator may be electrically connected to the inverter. A strength of the generated field may be based on the output voltage of the converter and/or an input voltage of the inverter.

According to another aspect there is provided a non-transitory computer readable medium comprising computer-executable code for execution on a processor to perform any of the described methods.

According to another aspect there is provided a transmitter of a wireless power transfer system, the transmitter for wirelessly transferring power through a medium to a receiver of the wireless power transfer system.

The transmitter may comprise:
  a transmit resonator for wirelessly transferring power through a medium to a receiver of the wireless power transfer system;
  an inverter electrically connected to the transmit resonator; and
  a controller for controlling an input voltage of the inverter based on a detected parameter.

The described controllers may comprise a MCU.

The transmitter may further comprise:
  a sensor for detecting the parameter at the transmitter and/or receiver.

The parameter may comprise rectified voltage at the receiver of the wireless power transfer system. The rectified voltage may be at a receiver resonator of the receiver. The rectified voltage may be rectified power signal extracted from a field generated by the transmitter.

The transmitter may further comprise:
  a communication module for receiving the parameter from a receiver of the wireless power transfer system.

The communication module may comprise a controller for detecting a parameter change at the transmitter based on a modification to the operation of the synchronous rectifier of the receiver. The communication module may receive the parameter via a communication protocol including Bluetooth, Wi-Fi, 5G, or other suitable communication protocol.

The controller may be further adapted to determine data communicated from the receiver to the transmitter based on the parameter change.

The controller may further comprise:
  a detector for detecting a voltage and/or current waveform at the transmitter.

The detector may further comprise:
  a demodulator adapted to demodulate a voltage and/or current waveform at the transmitter.

The detector may comprise:
  a filter adapted to filter the demodulated voltage and/or current.

The detector may be adapted to:
  generate logic levels based on the filtered voltage and/or current; and
  decode data based on the generated logic levels.

The detector may be adapted to:
  determine time intervals between the logic levels; and
  decode data based on the time intervals.

The controller may further comprise a power source for supplying power to the controller.

The power source may comprise an auxiliary DC/DC converter.

The controller may be supplied power by a LDO regulator.

The controller may further comprise:
  a scaling unit for reduce the amplitude of the detected voltage or current waveform. Reducing the amplitude of the waveform my simplify processing of the waveform.

The controller may further comprise:
  a peak detector for detecting peaks in the detected voltage or current waveform.

The controller may further comprise:
  a signal conditioner.

The signal conditioner may be adapted to amplify the detected voltage or current waveform.

The signal conditioner may be adapted to compare the detected voltage or current waveform against a reference level, e.g., a reference voltage or current level. The signal conditioner may be adapted to output a logic level signal, e.g., 0 or 1, based on the comparison.

The signal conditioner may comprise a comparator. The comparator may be adapted to perform the described comparison.

The controller may further comprise:
  an encoder for receiving data and encoding the data into a time sequence. Thus, data to be transmitted from the receiver to the transmitter may be encoded into a time sequence of synchronous and non-synchronous operation of the synchronous rectifier. The data may be binary data.

The synchronous rectifier may be toggled between synchronous and non-synchronous operation based on the time sequence encoded by the encoder. Toggling of the synchronous rectifier according to the time sequence may result in a detectable parameter change at the transmitter which may be demodulated or decoded into the data thereby communicating data from the receiver to the transmitter.

According to another aspect there is provided a wireless power transfer system comprising:
  a transmitter comprising a transmitter resonator for wirelessly transferring power through a medium to a receiver of the wireless power transfer system, and an inverter electrically connected to the transmit resonator;
  a receiver comprising a receive resonator for wirelessly extracting power from the transmitter via electric and/or magnetic field coupling; and
  a controller for controlling an input voltage of the inverter based on a detected parameter.

The system may further comprise:
  a sensor for detecting the parameter at the transmitter and/or receiver.

The parameter may comprise rectified voltage at the receiver of the wireless power transfer system. The rectified voltage may be at a receiver resonator of the receiver. The rectified voltage may be rectified power signal extracted from a field generated by the transmitter.

The receiver may further comprise:
  a communication module for communicating the parameter from the receiver to the transmitter.

The communication module may comprise a controller. The controller may comprise a MCU. The controller may be adapted to modify operation of the synchronous rectifier to alter a parameter detectable at the transmitter. The communication module may communicate the parameter via a communication protocol including Bluetooth, Wi-Fi, 5G, or other suitable communication protocol.

The controller may be adapted to toggle the synchronous rectifier between synchronous operation and non-synchronous operation.

The controller may be adapted to selectively enable and disable the synchronous rectifier.

Selectively enabling and disabling the synchronous rectifier may comprise enabling and disabling synchronous operation of the synchronous rectifier. Modifying operation of the synchronous rectifier may comprise toggling operation of the synchronous operation. The time between selectively enabling/disabling or toggling operation may be altered to communicate data from the receiver to the transmitter.

The controller may be electrically connected to the synchronous rectifier. The controller may be electrically connected to at least one of:
a trigger circuit of the synchronous rectifier; and
a gate driver of the synchronous rectifier, the gate driver electrically connected to the trigger circuit and a rectifier element of the synchronous rectifier.

The controller may be adapted to control operation of a comparator of the trigger circuit. Controlling operation of the comparator may comprise selectively enabling power to the comparator. The comparator may comprise a comparator circuit.

The controller may be electrically connected to:
an auxiliary DC/DC converter of the synchronous rectifier, the auxiliary DC/DC converter for powering at least one of the trigger circuit and gate driver.

The controller may be adapted to selectively enable and disable operation of the auxiliary DC/DC converter to selectively power at least one of the trigger circuit and the gate driver. Selectively enabling/disabling the auxiliary DC/DC converter may comprise controlling power supplied to the auxiliary DC/DC converter.

The controller may further comprise a power source for supplying power to the controller. The power source may supply power to at least one of the trigger circuit and the gate driver. The power source may be powered by power received at the receiver, e.g., power received from the transmitter via wireless power transfer.

The power source may comprise an auxiliary DC/DC converter.

The controller may be supplied power by a LDO regulator.

The transmitter may further comprise:
a communication module for receiving the parameter from the receiver.

The communication module may further comprise a controller. The controller may comprise a microcontroller (MCU). The controller may be adapted to detect a parameter change at the transmitter based on a modification to the operation of the synchronous rectifier of the receiver. The communication module may receive the parameter via a communication protocol including Bluetooth, Wi-Fi, 5G, or other suitable communication protocol.

The controller may be further adapted to determine data communicated from the receiver to the transmitter based on the parameter change.

The controller may further comprise:
a detector for detecting a voltage and/or current waveform at the transmitter.

The detector may further comprise:
a demodulator adapted to demodulate a voltage and/or current waveform at the transmitter.

The detector may comprise:
a filter adapted to filter the demodulated voltage and/or current.

The detector may be adapted to:
generate logic levels based on the filtered voltage and/or current; and
decode data based on the generated logic levels.

The detector may be adapted to:
determine time intervals between the logic levels; and
decode data based on the time intervals.

The controller may further comprise a power source for supplying power to the controller.

The power source may comprise an auxiliary DC/DC converter.

The controller may be supplied power by a LDO regulator.

The controller may further comprise:
a scaling unit for reduce the amplitude of the detected voltage or current waveform. Reducing the amplitude of the waveform my simplify processing of the waveform.

The controller may further comprise:
a peak detector for detecting peaks in the detected voltage or current waveform.

The controller may further comprise:
a signal conditioner.

The signal conditioner may be adapted to amplify the detected voltage or current waveform.

The signal conditioner may be adapted to compare the detected voltage or current waveform against a reference level, e.g., a reference voltage or current level. The signal conditioner may be adapted to output a logic level signal, e.g., 0 or 1, based on the comparison.

The signal conditioner may comprise a comparator. The comparator may be adapted to perform the described comparison.

The controller may further comprise:
an encoder for receiving data and encoding the data into a time sequence. Thus, data to be transmitted from the receiver to the transmitter may be encoded into a time sequence of synchronous and non-synchronous operation of the synchronous rectifier. The data may be binary data.

The transmitter may further comprise:
a converter electrically connected to the inverter. The converter may comprise a DC/DC converter.

The controller may be configured for controlling an output voltage of the converter based on the detected parameter. The output voltage of the converter may define an input voltage of the inverter.

According to another aspect there is provided a computer-readable medium comprising instructions that, when executed by a processor, perform any of the described methods.

The computer-readable medium may be non-transitory. The computer-readable medium may comprise storage media excluding propagating signals. The computer-readable medium may comprise any suitable memory or storage device such as random-access memory (RAM), static RAM (SRAM), dynamic RAM (DRAM), non-volatile RAM (NVRAM), read-only memory (ROM), or Flash memory.

The processor may have a single-core processor or multiple core processors composed of a variety of materials, such as silicon, polysilicon, high-K dielectric, copper, and so on.

According to another aspect there is provided a computer program comprising instructions that, when executed by a processor, perform any of the described methods.

The invention includes one or more corresponding aspects, embodiments or features in isolation or in various combinations whether or not specifically stated (including claimed) in that combination or in isolation. As will be appreciated, features associated with particular recited embodiments relating to systems may be equally appropriate as features of embodiments relating specifically to methods of operation or use, and vice versa.

The above summary is intended to be merely exemplary and non-limiting.

BRIEF DESCRIPTION OF THE DRAWINGS

These and other aspects of the present disclosure will now be described, by way of example only, with reference to the accompanying Figures, in which.

DETAILED DESCRIPTION OF THE DRAWINGS

Figure 1:
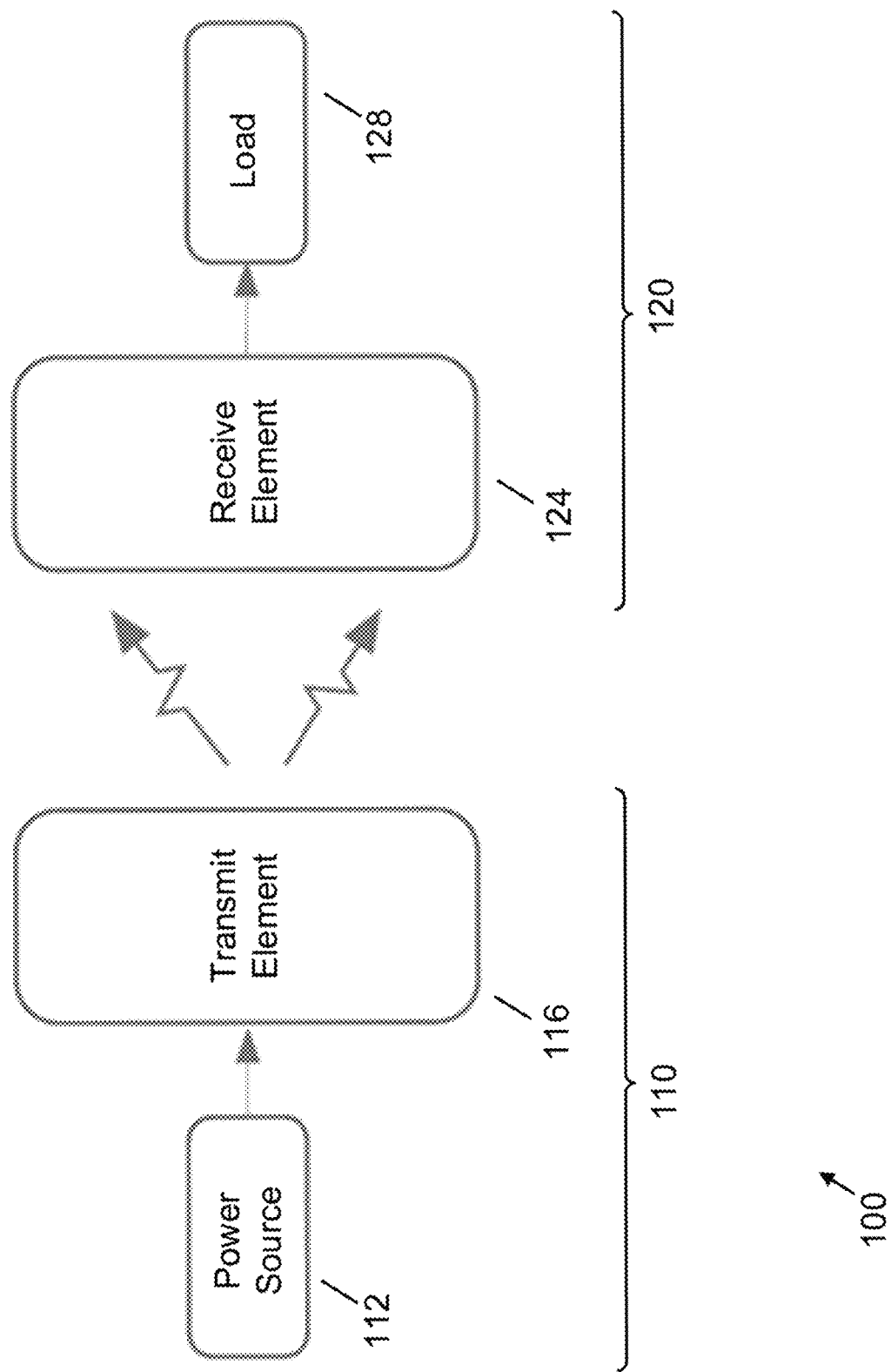
FIG. 1 is a block diagram of a wireless power transfer system.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property might further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, or within less than 0.01% of the stated amount.

Turning now to FIG. 1, a wireless power transfer system generally identified by reference numeral 100 is shown. The wireless power transfer system 100 comprises a transmitter 110 comprising a power source 112 electrically connected to a transmitter element 116, and a receiver 120 comprising a receiver element 124 electrically connected to a load 128. Power is transferred from the power source 112 to the transmitter element 116. The power is then transferred from the transmitter element 116 to the receiver element 124 via resonant or non-resonant electric or magnetic field coupling. The power is then transferred from the receiver element 124 to the load 128. Exemplary wireless power transfer systems 100 include a high frequency inductive wireless power transfer system as described in applicant's U.S. Provisional Application No. 62/899,165, or a resonant capacitively coupled wireless power transfer system as described in applicant's U.S. Pat. No. 9,653,948B2, the relevant portions of which are incorporated herein.

In the wireless power transfer system 100, power is transferred from the transmitter element 116 to the receiver element 124. Exemplary wireless power transfer systems 100 include a high frequency inductive wireless power transfer system as described in U.S. patent application Ser. No. 17/018,328, the relevant portions of which are incorporated herein.

Figure 2:
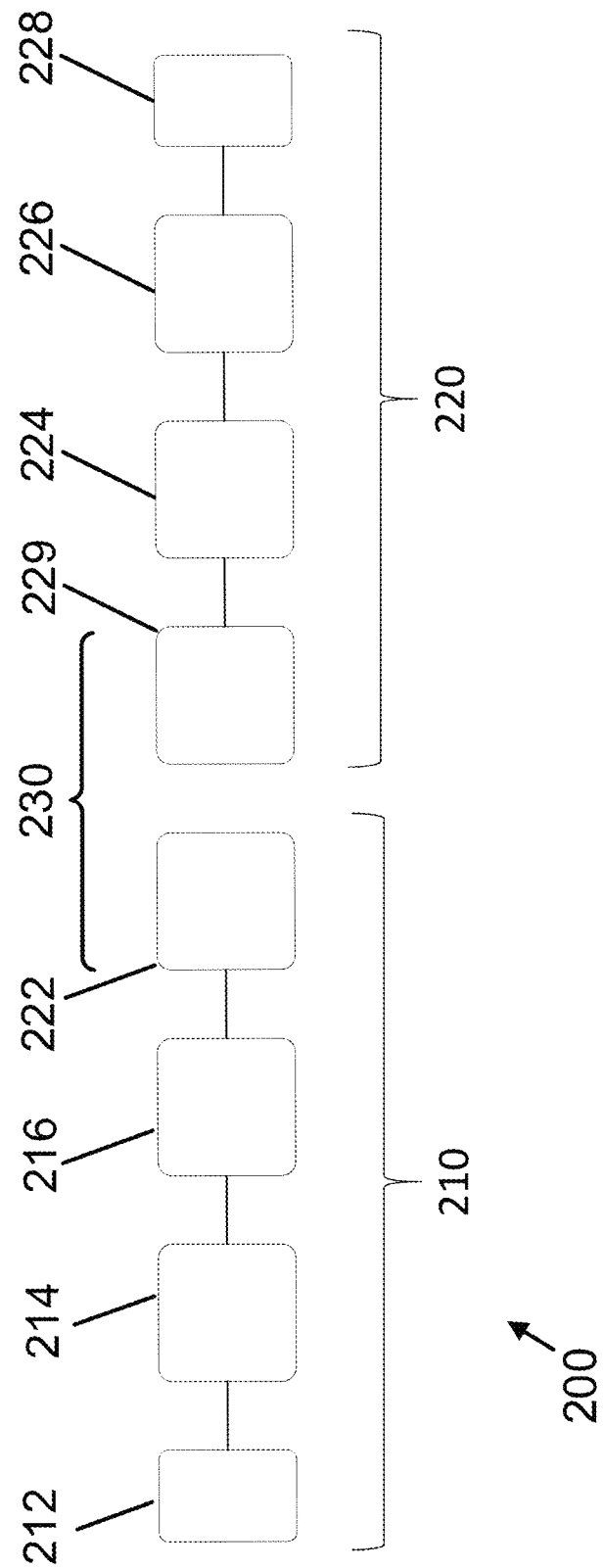
FIG. 2 is another block diagram of a wireless power transfer system.

Turning now to FIG. 2, another embodiment of a wireless power transfer system is shown generally identified as reference numeral 200. The wireless power transfer system 200 comprises a power supply 212, DC/DC converter 214, circuitry 216, and transmitter element 222. The power supply 212 is electrically connected to the DC/DC converter 214. The DC/DC converter 214 is electrically connected to circuitry 216. The circuitry 216 is electrically connected to the transmitter element 222.

The power supply 212 is for generating an input power signal for transmission of power. In this embodiment, the input power signal is a direct current (DC) power signal.

The DC/DC converter 214 is for converting a received DC voltage signal to a desired voltage level. The received DC voltage may be from the power supply 212. The system 200 is illustrated as comprising the DC/DC converter 214, one of skill in the art will appreciate other configurations are possible. In another embodiment, no DC/DC converter is present.

In the illustrated arrangement, the circuitry 216 comprises an inverter and an output stage. The output stage matches the output impedance of the circuitry 216 to the optimum impedance of a wireless link 230 between the transmitter and receiver. The output stage also filters high frequency harmonic components of the inverter.

The transmitter element 222 comprises one or more inductive elements, i.e., inductors. The inductive elements may comprise one or more coils. The coils may include booster or shield coils such as described in applicant's U.S. patent application Ser. No. 17/193,539, the relevant portions of which are incorporated herein by reference.

In another arrangement, the transmitter element 222 comprise one or more capacitive elements, e.g., capacitive electrodes. The capacitive electrodes may be laterally spaced, elongate electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. As one of skill in the art will appreciate, the transmitter element 222 may comprise a combination of inductive and capacitive elements.

The power source 212 supplies a DC input power signal to the DC/DC converter 214 which converts the signal to a desired voltage level. The inverter of the circuitry 216 receives the converted DC power signal and inverts the converted DC power signal to generate a magnetic and/or electric field at the transceiver element 222 to transfer power via electric or magnetic field coupling. Specifically, the transmitter element 222 generates a magnetic/electric field to transfer power to the receiver via magnetic/electric field coupling. The power source 212, DC/DC converter 214, circuitry 216 and transmitter element 222 may collectively form a transmitter 210. As previously stated, the DC/DC converter 214 may not be present in the transmitter 210.

The wireless power transfer system 200 further comprises load 228, DC/DC converter 226, circuitry 224, and receiver element 229. The load 228 is electrically connected to the DC/DC converter 226. The DC/DC converter 226 is electrically connected to circuitry 224. The circuitry 224 is electrically connected to the receiver element 229.

In the illustrated arrangement, the load 228 is a DC load. The load 228 may be static or variable.

The DC/DC converter 226 is for converting a received DC voltage signal to a desired voltage level. The received DC voltage may be from the circuitry 224. While the system 200 comprises the DC/DC converter 226, one of skill in the art will appreciate other configurations are possible. In another embodiment, no DC/DC converter 226 is present.

The circuitry 224 comprises an input stage and a rectifier, e.g., diode rectifier or synchronous rectifier. The input stage is configured to ensure optimum impedance presented to the receiver element 229 at the full power state of the wireless power transfer system 200. The input stage may also preserve the quasi-voltage source behaviour of the receiver element 229 so the output of the synchronous rectifier exhibits a stable DC voltage from no load to full load conditions.

The receiver element 229 comprises one or more inductive elements, i.e., inductors. The receiver element 229 may comprise one or more coils. The coils may include booster or shield coils such as described in applicant's U.S. patent application Ser. No. 17/193,539, the relevant portions of which are incorporated herein by reference.

In another arrangement, the transmitter element 222 comprise one or more capacitive elements, e.g., capacitive electrodes. The capacitive electrodes may be laterally spaced, elongate electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. As one of skill in the art will appreciate, the transmitter element 222 may comprise a combination of inductive and capacitive elements.

The transmitter and receiver elements 222, 229 of the system 200 form the wireless link 230. The elements 222, 229 are separated by a wireless gap. The wireless gap may be formed by atmosphere, i.e. air, or by a physical medium, e.g., walls, glass, liquids, wood, insulations, etc. Power is transferred from one element to the other across the wireless link 230 via resonant or non-resonant magnetic and/or electric field coupling, i.e., electric or magnetic induction.

During operation, the receiver element 229 extracts power from a magnetic and/or electric field generated by the transmitter element 222. The circuitry 224 acts as a rectifier, e.g., diode rectifier or synchronous rectifier, and rectifies the received power signal. The DC/DC converter 226 converts the rectified power signal to the desired power level which is received by the load 228. In this way, the receiver element 229 extracts power transmitted by the transmitter element 222 (transmitter 210) such that electrical power is transferred to the load 228 via magnetic/electric field coupling. The load 228, DC/DC converter 226, circuitry 224 and receiver element 229 may collectively form a receiver 220. As previously stated, the DC/DC converter 226 may not be present in the receiver 220.

Figure 3:
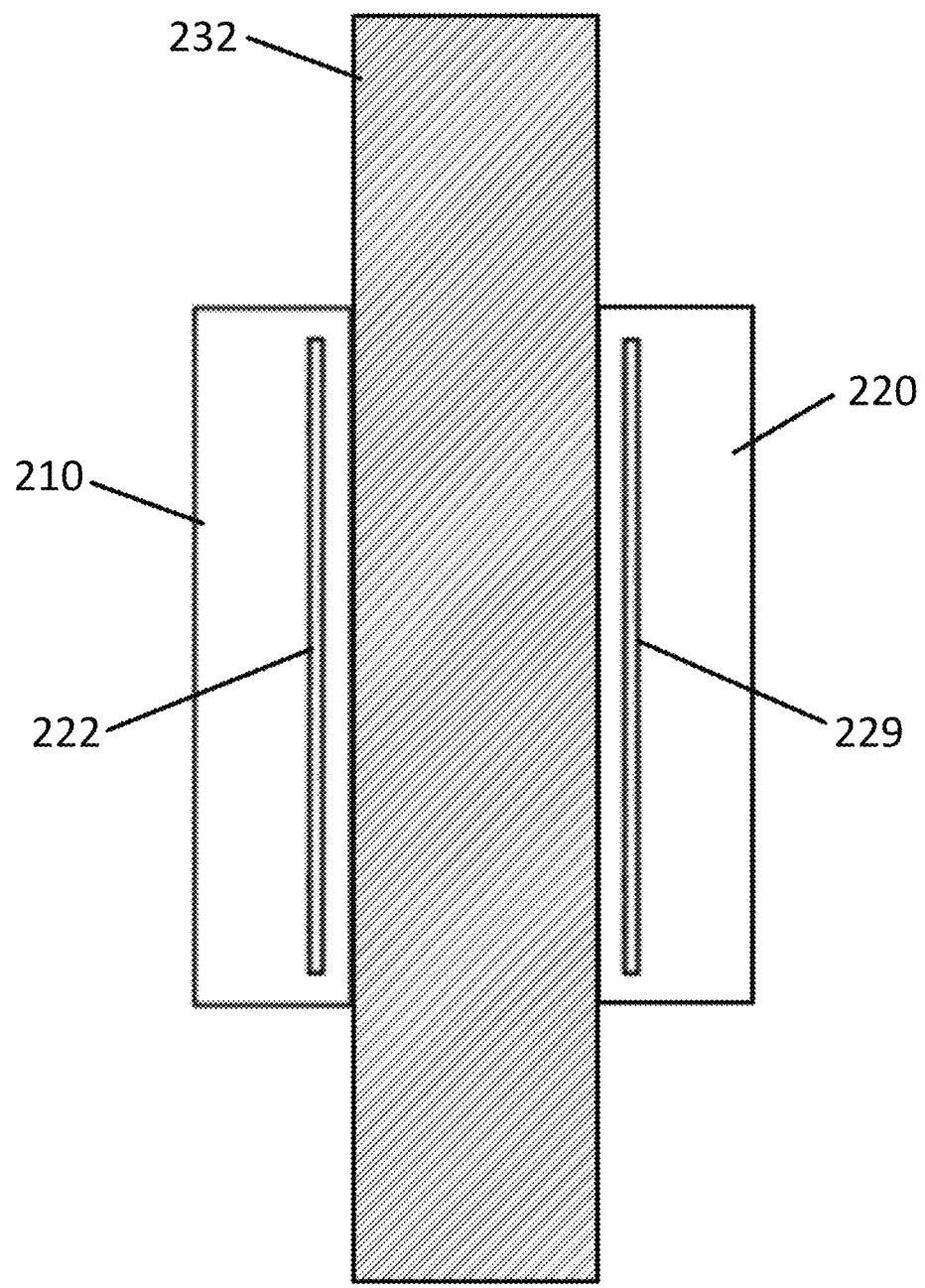
FIG. 3 is a block diagram of a transmitter and receiver of the wireless power transfer system of FIG. 2 separated by a medium.

Turning now to FIG. 3, the transmitter 210 and receiver 220 of the system 200 are illustrated. In the illustrated arrangement, the transmitter 210 and receiver 220 are separated by a medium 232. The medium 232 is between the transmitter 210 and receiver 220. The medium 232 may define the separation distance between the transmitter element 222 and the receiver element 229.

The medium 232 may be, at least partially, in the form of an air-gap, or may at least partially be a physical medium such as glass, wood, concrete or other building supply. The wireless power transfer system 200 may be tuned for a particular medium 232, e.g., a thickness of the medium or a material property of the medium. Altering a characteristic of the medium 232, e.g., the thickness, or changing the medium entirely, e.g., other materials being introduced in the space between transmitter 210 and receiver 220 may result in sub-optimal wireless power transfer between transmitter 210 and receiver 220. The tuning of the system 200 may be sub-optimal for the new altered medium 232 or new medium characteristic or parameter. As a result, power transfer from the transmitter 210 to the receiver 220 may be sub-optimal, e.g., reduced average power transfer efficiency. Adjusting wireless power transfer in view of changes to the medium 232 may accordingly improve average power transfer efficiency. The disclosure may provide for such improved average power transfer efficiency.

For example, the system 200 can transfer electrical power wirelessly through the medium 232 having a thickness of 15 mm. The medium 232 may be removed and replaced with a medium 232 having a thickness of 30 mm and the power transfer will continue as efficiently as it did on the 15 mm thickness. Further, the medium 232 may be of a dynamic thickness, i.e., the thickness of the medium, and therefore the separation, between the transmitter 210 and receiver 220 may be changed without significantly affecting power transfer. For example, consider 2 panes of glass with a distance between them of 15 mm. If the panes were further separated to 30 mm, the power transfer will be maintained and will continue as efficiently as the 15 mm separation, without any observable change in power transfer, and without any required external modification. In another example, the transmitter 210 and receiver 220 may change location relative to a portion of the medium such that separation distance between the transmitter 210 and receiver 220 changes. The system 200 self-optimizes based on the material and distance between the transmitter 210 and receiver 220 defined by the medium 232. While the average power transfer efficiency may change when the medium 232 changes as described, the change, e.g., decrease, will not be as significant as conventional systems in which inverter input voltage (DC/DC converter output voltage) is not modified in response to a change at the medium 232.

The wireless power transfer system 200 may comprise a high frequency wireless power transfer system as described in the '328 application. The high frequency wireless power transfer system is an inductive system. One of reasonable skill in the art will appreciate that the high frequency wireless power transfer system may be configured to transfer power via high frequency magnetic inductive coupling or high frequency electric capacitive coupling. In magnetic inductive coupling systems, the majority of power transfer occurs via the magnetic field. Little, if any, power is transferred via electric capacitive or resonant electric capacitive (electric fields). In electric capacitive coupling systems, the majority of power transfer occurs via the electric field. Little, if any, power is transferred via magnetic inductive or resonant magnetic induction.

The high frequency wireless power transfer system is configured to transfer power via high frequency magnetic field coupling. The transmitter 210 of the high frequency wireless power transfer system is configured to operate a given frequency, and the receiver 220 is configured to operate at the operational frequency of the transmitter 210.

As shown in FIG. 3, the transmitter 210 is positioned adjacent to the medium 232. The transmitter 210 may be affixed to the medium 232. For example, the transmitter 210 may be affixed to a window of a building. The medium 232 may be a fabricated material and may be fabricated from any type of material or material combination that is not conductive or magnetic, e.g., wood, glass, stone, brick, concrete, plastic, except for materials or a combination of materials that would cause termination of the fields prematurely, i.e., act as a shield. For example, a medium comprising a wall covered with foil-backed insulation may terminate a generated field and act as a shield, preventing wireless power transfer between transmitter 210 and receiver 220.

However, a medium 232 comprised of non-shielding materials with fragments of partially shielding material may still allow wireless power transfer through the fragments. For example, a medium comprising a wall constructed of wood, insulation, vinyl siding, with nails/staples or other metallic materials embedded in small amounts, may not terminate a generated field and still allow wireless power transfer between transmitter 210 and receiver 220.

Further, the medium 232 may comprise one or more coatings, e.g., coatings on glass. For example, the medium 232 may comprise glass having a metal-oxide coatings, e.g., silver (Ag, Ag2 or Ag3). The coatings may not prevent wireless power transfer through the glass as the coating has an extremely thin skin-depth. Although these coatings are often electrically conductive, the coatings thicknesses are generally in the order of tens of nanometres or smaller. Although the coatings may be electrically conductive, the thicknesses are small compared to the wavelength of the wireless power systems operating frequency (layer thickness is small compared to the skin depth at the systems operating frequency). Thus, a field generated by a transmitter, e.g., transmitter element, is able to penetrate through the coatings to be received by the receiver, e.g., receiver element. While some power may be lost due to the presence of the coatings, this is generally minor. The amount of power dissipated in the coatings may be dependent on the coating material, layer thickness, and system operating frequency.

Further, the medium 232 may comprise casings or framing, e.g., metal window casing. Again, this will generally not terminate the power transfer even if the transmitter and receiver are positioned on opposite sides in a corner of the medium 232 proximate the casings or framing. Again, power may be dissipated in the casings or framing thereby reducing power transfer efficiency. The amount of power dissipated may be dependent on the casing or framing material, thickness, and system operating frequency.

The receiver 220 is positioned on the opposite side of the medium 232, such that the medium 232 is directly between the transmitter 210 and receiver 220. The transmitter 210 and receiver 220 may thus be co-planar, i.e., in the same plane which passes through the medium. One of reasonable skill in the art will recognize that more than one transmitter 210 and receiver 220 is possible.

In this embodiment, the transmitter 210 includes the described transmitter element 222 which may take the form of an inductive coil or inductor, and the receiver 220 includes the described receiver element 229 which may take the form of an inductive coil or inductor. One of skill in the art will recognize that more than one transmitter element 222 and/or receiver element 229 are possible.

The transmitter element 222 may operate in current-mode output (constant current output). In current-mode output, the transmitter 210 is configured to generate a magnetic field without the requirement for a receiver 220 to be present near the transmitter 210.

Generally, current-mode output high frequency wireless power transfer systems differ from voltage-mode output (constant voltage output) high frequency wireless power transfer systems in that voltage-mode output transmitters 210 cannot generate and maintain a magnetic field without a receiver 220 present near the transmitter 210. If a receiver 220 is not present in a voltage-mode output high frequency wireless power transfer system, the transmitter 210 will essentially operate in a short-circuit condition, and therefore cannot sustain generation of a magnetic field.

Power transfer from transmitter 210 to receiver 220 occurs through the medium 232. In order to maximize the coupling coefficient value and the highest power transfer efficiency, the transmitter 210 and receiver 220 should be optimally aligned. If the material 230 is opaque or if it completely obstructs view of the position of either the transmitter 210 or receiver 220, or both, it may be problematic to optimally align the transmitter 210 and receiver 220.

In optimal alignment of the receiver 220 with the transmitter 210, the receiver element 229 is in optimal alignment with the transmitter element 222. The transmitter 210 and receiver 220 may be optimally aligned according to methods and apparatus described in applicant's U.S. patent application Ser. No. 17/083,735, the relevant portions of which are incorporated herein.

Figure 4:
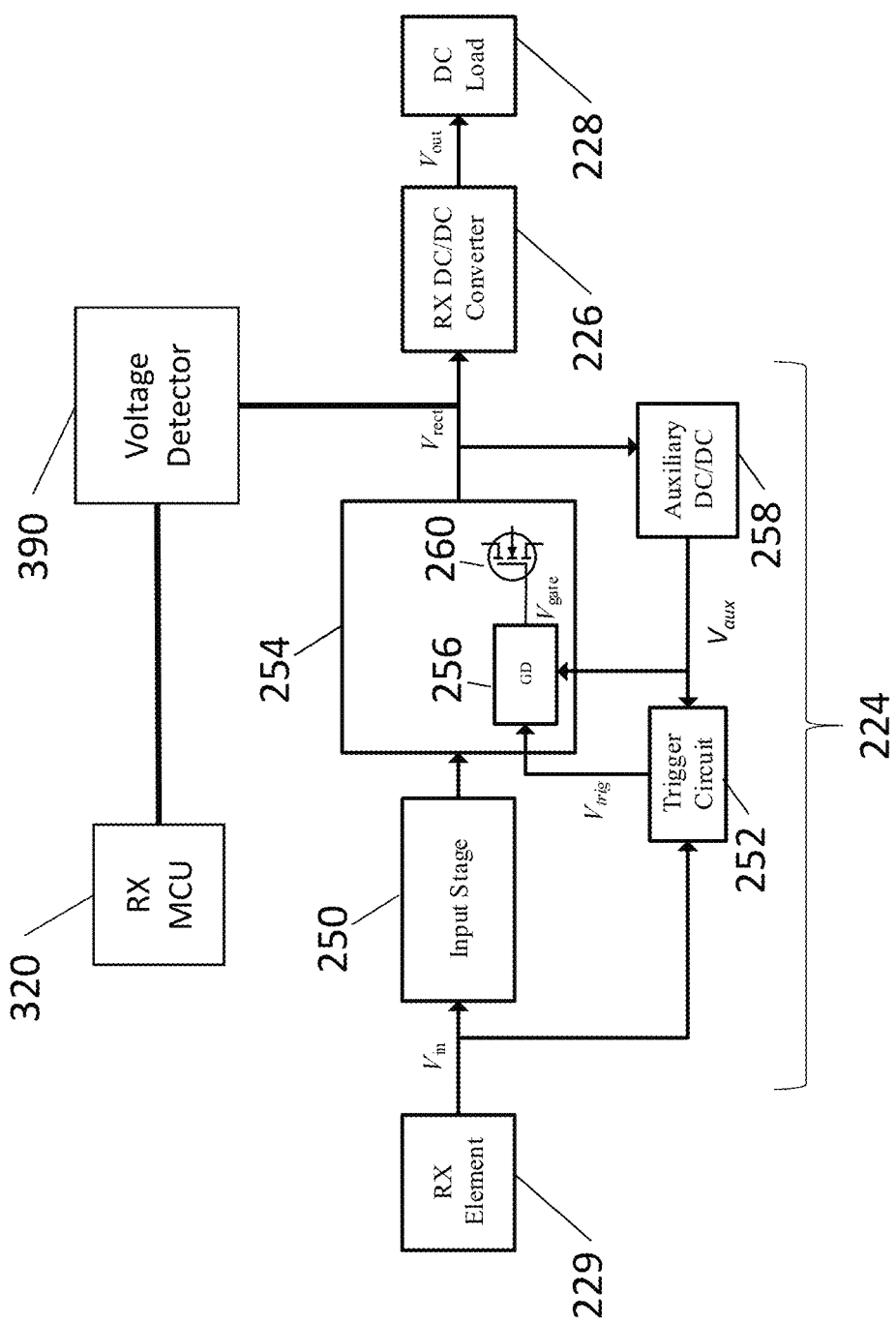
FIG. 4 is a block diagram of the receiver of the wireless power transfer system of FIG. 2.

Turning now to FIG. 4, the receiver 220 of the system 200 is shown in greater detail. In the illustrated arrangement, the circuitry 224 comprises an input stage 250, a trigger circuit 252, a rectifier element 254, a gate driver 256 and an auxiliary DC/DC converter 258.

The receiver element 229 is electrically connected to the input stage 250 and trigger circuit 252. The receiver element 229 is configured to receive power from a transmitter, e.g., transmitter 210, using resonant or non-resonant electric or magnetic field coupling. The receiver element 229 may extract power from a transmitter via non-resonant or resonant magnetic or electric field coupling. As such, the receiver element 229 comprises one or more receive coils (i.e., inductors) or one or more capacitive electrodes. The corresponding transmitter comprises corresponding transmit coils (i.e., inductors) or capacitive electrodes, respectively.

The receiver element 229 extracts power from the transmitter and as such outputs an input voltage or signal Vin which corresponds to the extracted power or signal.

The input stage 250 is electrically connected to the rectifier element 254, receiver element 229 and trigger circuit 252. The input stage 250 is adapted to perform any combination of three functions. In particular, the input stage 250 is for converting the impedance presented by the rectifier element 254 under nominal loading to the optimal load impedance for the receiver element 229. The input stage 250 is for reducing harmonic content generated by the nonlinear action of the rectifier element 254 such that the receiver 220, and by extension, the wireless power system that the receiver 220 forms a part of, may meet international product requirements relating to electromagnetic compatibility (EMC). The input stage 250 is for ensuring that current input into the rectifier element 254 is approximately sinusoidal.

In this embodiment, the input stage 250 comprises a matching network or circuit. Various matching networks are possible. In this embodiment, the matching network takes the form of a double stage impedance inverter. The double stage impedance inverter is electrically connected to the receiver element 229. The input stage 250 may further comprise additional filtering added in series with the rectifier element 254. The use of the double impedance inverter topology may beneficially ensure the rectifier element 254 is driven by a quasi-constant voltage source. While a double stage impedance inverter is described, one of skill in the art will appreciate the matching network may take the form of a single stage impedance inverter.

The input stage 250 is configured to ensure optimum impedance presented to the receiver element 229 at the full power state of the wireless power transfer system 200. The input stage 250 may also preserve the quasi-voltage source behaviour of the receiver element 229 so the output of the synchronous rectifier exhibits a stable DC voltage from no load to full load conditions.

The rectifier element 254 is electrically connected to the input stage 254, the primary receiver DC/DC converter 226, i.e., the primary receiver DC/DC converter, and the auxiliary DC/DC converter 258.

The rectifier element 254 comprises an amplifier. The amplifier is a class E amplifier. The amplifier comprises the gate driver 256 and a main switch. The gate driver 256 drives the main switch of the amplifier. In this embodiment the main switch comprises an n-type MOSFET 260. While an n-type MOSFET 260 has been illustrated, one of skill in the art will appreciate other FETs and switching devices may be used.

The DC/DC converter 226 is electrically connected to the rectifier element 254, auxiliary DC/DC converter 258 and load 228, e.g., DC load. The primary receiver DC/DC converter 226 is for receiving the DC power signal output from the rectifier element 254, Vrect. The DC/DC converter 226 interfaces the rectifier element 254 to the load 228. The DC/DC converter 226 is for converting the received DC power signal. The converted DC power signal is output from the DC/DC converter 226 to the load 228.

The auxiliary DC/DC converter 258 is additionally electrically connected to the input of the primary receiver DC/DC converter 226. The auxiliary DC/DC converter 258 is electrically connected to DC/DC converter 226, trigger circuit 252 and gate driver 256 of the rectifier element 254. The auxiliary DC/DC converter 258 is for converting the Vrect output by the rectifier element 254 to an auxiliary voltage range, e.g., in the range of 5V, Vaux, to power the trigger circuit 252 and gate driver 256. The auxiliary power voltage or signal Vaux powers the trigger circuit 252 and gate driver 256. Until the auxiliary DC/DC converter 258 can regulate, the FET 260 of the rectifier element 254 is off and the rectifier element 254 acts as a passive (diode) rectifier. In this embodiment, the auxiliary DC/DC converter 258 comprises a low-power buck converter.

The gate driver 256 is electrically connected to the rectifier element 254, the auxiliary DC/DC converter 258 and the trigger circuit 252. The gate driver 256 is powered by a signal, e.g. Vaux, from the auxiliary DC/DC converter 258. The gate driver 256 outputs a signal to switch the FET 260 of the rectifier element 254. In particular, the gate driver 256 outputs a gate drive voltage or gate signal, Vgate, to control operation of the rectifier element 254, e.g., control switching of the FET 260 of the rectifier element 254.

The trigger circuit 252 is electrically connected to the rectifier element 254. The trigger circuit 252 is for is for synchronizing wireless power transfer. The trigger circuit 252 is further electrically connected to the receiver element 229 and the input stage 250. To address the challenge of the non-negligible propagation delays from the gate driver 256 and the trigger circuit 252, the trigger circuit 252 is designed such that the trigger circuit 252 further delays the output signal Vtrig to ensure Vgate is synchronized with Vin.

The load 228 is electrically connected to the DC/DC converter 226. The load 228 receives the signal output by the DC/DC converter 226, Vout. The load 228 may be variable. As one of skill in the art will appreciate, the load 228 may be directly connected to the rectifier element 254 and receive Vrect if DC conversion is not required.

The gate signal, Vgate, controls flow of the current between the source and drain of the FET 260 thus controlling rectification of the input signal, Vin, received at the receiver element 229. As the gate signal is in phase with the input signal, the FET 260 operates as a class E inverter. A class E inverter generally operates at high efficiency resulting in a high efficiency rectifier.

The receiver 220 further comprises a voltage detector 390 electrically connected to a microcontroller 320. The voltage detector 390 detects the rectified voltage Vrect at the output of the rectifier element 254. The detected rectified voltage signal is then transferred to the microcontroller 320 which communicates the rectified voltage signal to the transmitter 210. The microcontroller 320 may comprise such a communication module for communicating a detected parameter, i.e., the rectified voltage signal to the transmitter 210. The communication module may communicate via a communication protocol including Bluetooth, Wi-Fi or any other suitable communication protocol.

Further, while the receiver 220 has been described as comprising the input stage 250 and DC/DC converter 226, one of skill in the art will appreciate that other configurations are possible. In particular, the receiver 220 may not comprise either one or both of the input stage 250 and the DC/DC converter 226.

Figure 5:
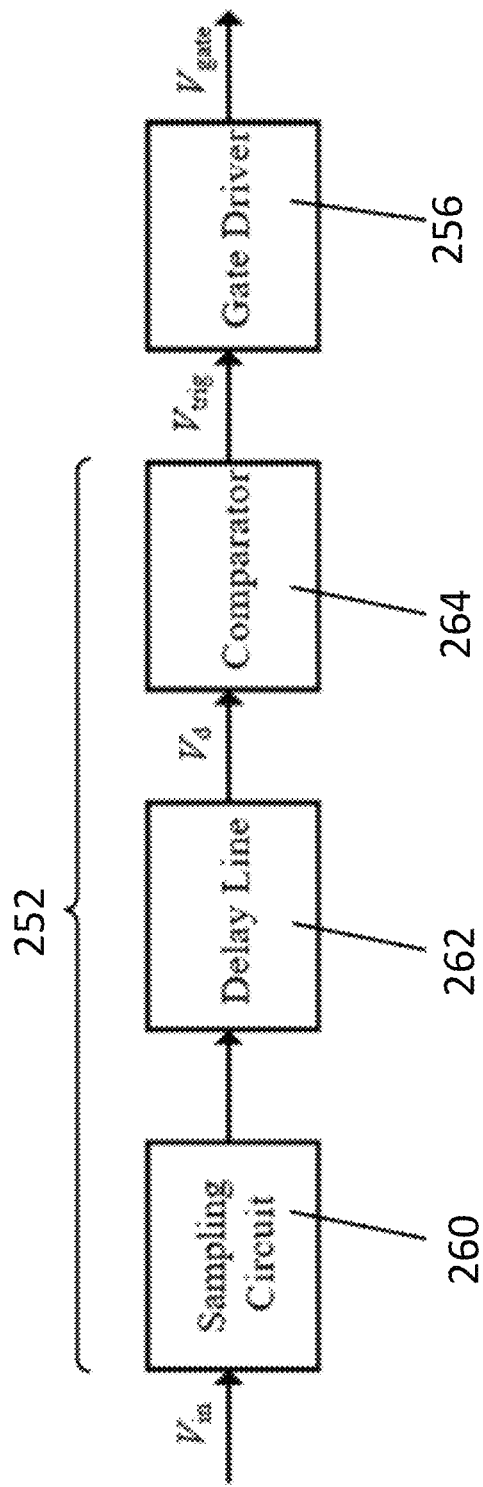
FIG. 5 is a block diagram of a portion of the circuitry of the receiver of FIG. 2.

Turning now to FIG. 5, a block diagram of a portion of the circuitry 224. Specifically, a block diagram of the trigger circuit 252 and gate driver 256 is shown. As shown in FIG. 4, the input voltage or signal Vin is sampled via a sampling circuit 260 and fed to a delay line 262. In this embodiment, the sampling circuit 260 is a voltage divider, and the delay line 262 is a lumped element delay line circuit. The output of the delay line 262 is fed to a comparator circuit 264. The comparator circuit 264 is for generating a clock signal by comparing the delayed signal (Vd) output by the delay line 262 to a DC level.

The resulting trigger voltage (Vtrig) is fed to the gate driver 256. The gate driver 256 converts the trigger voltage to a suitable waveform (Vgate) for driving the FET 260 of the rectifier element 254. Both the comparator circuit 264 and the gate driver 256 have propagation delays on the order of nanoseconds, which can be significant when dealing with switching periods of roughly 73.7 ns (for an operating frequency of 13.56 MHz) or 36.9 ns (for an operating frequency 27.12 MHZ). The sampling circuit 260, delay line 262 and comparator circuit 264 form the trigger circuit 252. These elements are designed to ensure that Vgate is synchronized with Vin.

Figure 6:
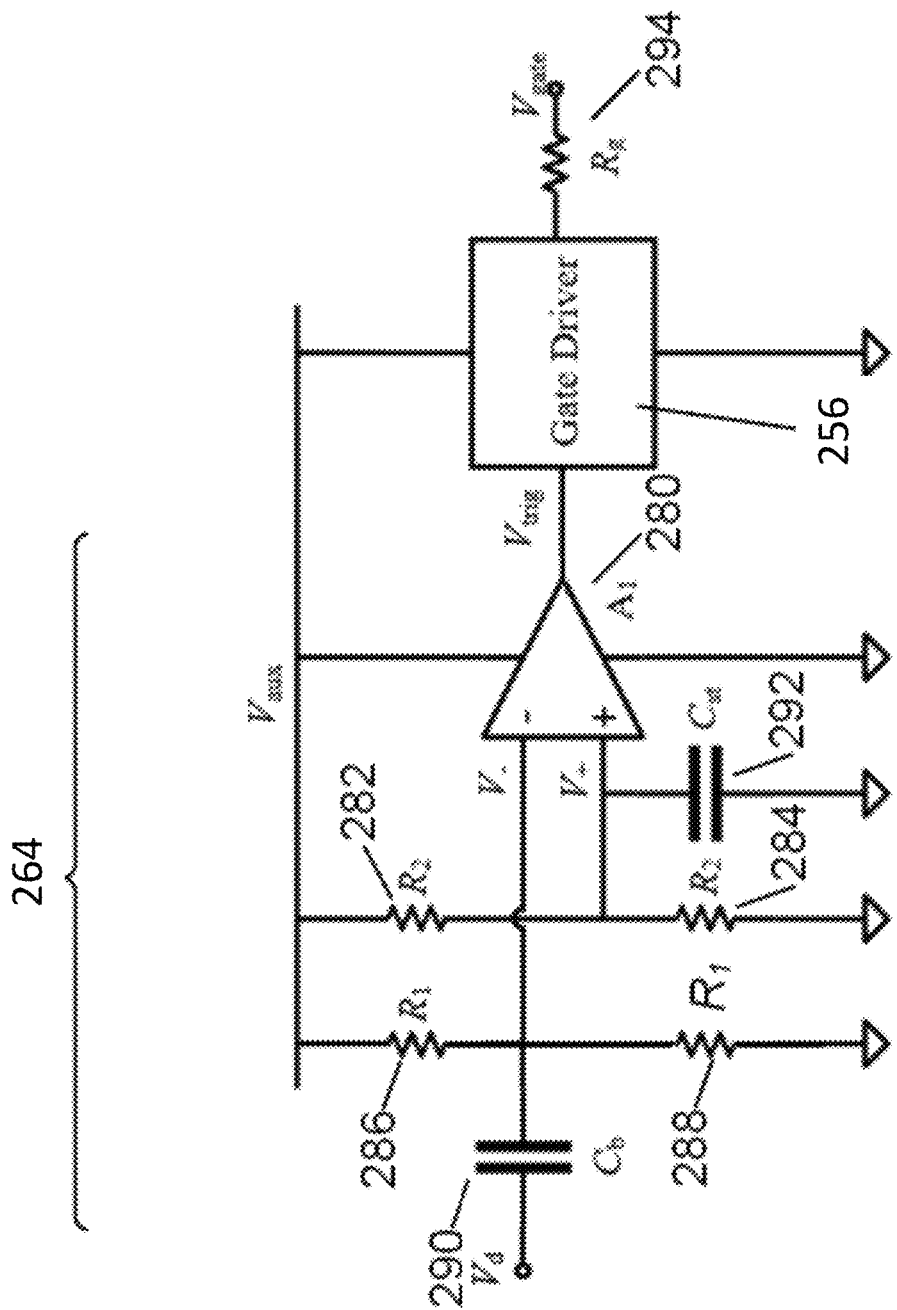
FIG. 6 is a schematic diagram of a portion of the circuitry of the receiver of FIG. 2.

Turning now to FIG. 6, a schematic diagram of another portion of the circuitry 224 is shown. The schematic diagram illustrates an exemplary arrangement of the comparator circuit 264 and the gate driver 256. As previously stated, the comparator circuit 264 is for generating a clock signal by comparing the delayed signal (Vd) output by the delay line 262 to a DC level.

As shown in FIG. 6, the comparator circuit 264 comprises a comparator 280 (A1) is powered from the auxiliary supply having an auxiliary supply voltage (Vaux). The inputs of the comparator 280 are biased to roughly half of Vaux. For the positive comparator input (V+) this is achieved using two equal-valued resistors 282, 284, each with resistance of R2. The negative comparator input (V−) this is achieved using two equal-valued resistors 286, 288, each with resistance of R1.

The delayed voltage signal (Vd) output by the delay line 262 is coupled to the negative comparator input (V−) via DC blocking capacitor 290 having a capacitance of (Cb) thus the trigger voltage (Vtrig) will be inverted (180° out-of-phase) relative to the delayed voltage signal (Vd). In terms of the total delay required to ensure that Vgate is in-phase with Vin, this effectively accounts for half of the switching period, thus reducing the burden on the delay line 262.

In operation, the rectified voltage Vrect is detected by the voltage detector 390. The detected rectified voltage Vrect is then communicated by the receiver microcontroller 320 to the transmitter 210. The transmitter 210 then controls the output voltage of the DC/DC converter 214, i.e., the input voltage to the inverter 216, based on the communicated rectified voltage, as will be described. The output voltage, i.e., input voltage to the inverter 216, determines a strength of the generated magnetic/electric field of the transmitter element 222. Thus, the field strength may be changed based on the rectified voltage at the receiver 220.

If a property or parameter of the medium 232 between the receiver 220 and transmitter 210 changes, the rectified voltage Vrect is affected as a result. For example, if the system 200 is tuned for a medium having a particular thickness, i.e., a certain separation distance between the transmitter 210 and receiver 220, using the system 200 on a medium having a different thickness may result in reduced average power transferred and reduced average power transfer efficiency. This may require retuning of the system 200. However, the rectified voltage Vrect is affected as a result of the change in thickness. As the rectified voltage Vrect is detected by the voltage detector 390 and communicated to the transmitter 210 by the receiver microcontroller 330, the transmitter 210 can alter the field strength by appropriately changing the output voltage of the DC/DC converter 214. Average power transferred and average power transfer efficiency is thereby increased and power transfer between the transmitter 210 and receiver 220 is optimised. Power losses at the receiver 220 and/or transmitter 210 may be reduced when the field strength is altered in view of the change to the medium 232 thereby improving, e.g., increasing, average power transferred and/or average power transfer efficiency.

In particular, the output voltage of the DC/DC converter 214 may be changed from a first voltage level to a second voltage based on the rectified voltage. The voltage detector may monitor the rectified voltage Vrect over a time period and if rectified voltage Vrect changes significantly enough in a short enough time, the controller 320 communicates the new rectified voltage Vrect to the transmitter 210 to change the output voltage to the second level. For example, if the rectified voltage Vrect goes down 4V in 1 s, the controller 320 at the receiver 210 or a controller at the transmitter may make a decision to increase the DC/DC converter 214 output voltage (the inverter 216 input voltage). If the rectified voltage Vrect goes up by a similar amount in a similar time frame, a controller at the transmitter may make a decision to control the DC/DC converter 214 to lower its output voltage (the inverter 216 input voltage).

The decision making by the controller at the transmitter is based on the relationship of the inverter 216 input voltage (the output voltage of the DC/DC converter 214) and the rectified voltage. If the rectified voltage is higher than expected, it may indicate the receiver 220 is closer to the transmitter 210 than expected, i.e., the separation distance has decreased, the medium 232 has reduced thickness or width. Alternatively, if the rectified voltage is lower than expected, it may indicate the receiver 220 is farther from the transmitter 210 than expected. The expected rectified voltage may be the rectified voltage at which the receiver 220 is operating. The rectified voltage may be higher than expected as a result of changes in the medium other than distance, such as composition. For example, if the system 200 is operating through a medium comprising glass, but then moved to operate through a medium comprising wood, the rectified voltage may decrease.

Once a controller at the transmitter 210 receives a rectified voltage from the receiver 220, i.e., from the receiver controller 230, the controller at the transmitter 210 may initiate an optimization sequence. In the sequence, the inverter 216 input voltage (DC/DC converter 214 output voltage) is increased or decreased based on the received rectified voltage.

For example, the initial input voltage may be 10 V. This voltage is used to generate a field at the transmitter element 224. The rectified voltage at the receiver 220 which is related to the power extracted from the generated field is communicated to the transmitter 210. The controller at the transmitter 210 then makes a decision whether to increase or decrease the input voltage. This decision could be to go to a higher inverter 216 input voltage if the rectified voltage Vrect is within an acceptable range (determined via experimentation) or turn the system 200 off/re-start optimization if the rectified voltage Vrect is either too high or too low. Turning the system 200 off, may mean dropping the input voltage to 0 V such that no field is generated.

If the rectified voltage Vrect is too high, the receiver 220 may be too close to the transmitter 210. A high rectified voltage Vrect at the receiver 220 may damage electrical components at the receiver, e.g., diodes. Thus, the input voltage will have to stay low to prevent damage which affects the switch-node tuning at the receiver negatively.

If the rectified voltage Vrect is too low, the receiver 220 may be too far away from the transmitter 210. In this instance, not enough power may be extracted to power the load 228 of the receiver 220, or the current into the rectifier element of the receiver 220 may be too high (because the voltage is low) which could result in excess heating at the receiver, or unstable power transfer.

Further, the controller at the transmitter 210 may increase the input voltage based on a ratio between the input voltage and the rectified voltage. For example, a rectified voltage of 50 V may indicate the receiver 220 is too close to the transmitter 210 if the input voltage is only 5 V. However, a rectified voltage of 50 V may be acceptable if the input voltage is 20 V.

While the controller has been described as being at the controller, in an alternate arrangement, the controller is at the receiver. The controller at the receiver sends a signal to the transmitter 210 to increase or decrease the inverter 216 input voltage (DC/DC converter 214 output voltage) based on the rectified voltage. All of the described decision making is performed by the controller at the receiver which then simply sends a control signal to the transmitter 210.

While the receiver 220 has been described as including circuitry 224 which acts as synchronous rectifier, one of skill in the art will appreciate other configurations are possible. For example, the circuitry 224 may operate as a non-synchronous rectifier as previously described. In this arrangement, the voltage detector 390 detects the rectified voltage Vrect and this signal is communicated to the receiver controller 320 for transmission to the transmitter 210 as described. Further, the voltage detector 390 may be excluded. In this arrangement, the rectified voltage Vrect is fed directly to an input of the receiver microcontroller 330 which communicates the rectified voltage value to the transmitter 210.

While the system 200 described may transfer power wirelessly, it may be desirable to send data from the receiver 220 to the transmitter 210. For example, it may be desirable to transmit data during the operation of the wireless power transfer system 200 to send relevant data, e.g., DC voltages, currents, temperatures, and customer data (e.g., battery charge), regarding the operating condition of the receiver 220. The data may then be used by the transmitter 210 for decision making in terms of authentication, protection, and operation of the system 200. Additionally, customer data may be transferred from receiver 220 to the transmitter 210 where it may then be transmitter to an end-user using a commonly used communication method such as Wi-Fi, Ethernet, Bluetooth, or USB.

To send data from the receiver to the transmitter in some wireless power transfer systems, a dummy load is introduced at the receiver to change the loading condition. The dummy lead, e.g., a resistor, is introduced in series via a switch connection at the output of a rectifier element of the receiver. By turning the switch ON and OFF, the loading condition of the system is changed, and this change can be detected on the transmitter and demodulated in order to receive data from the receiver.

This method presents several disadvantages. For example, the baud rate, i.e., transfer rate, of data transferred from the receiver to the transmitter is limited by the values of the dummy load and the total DC capacitance at the output of the rectifier element. Using smaller dummy loads can increase the baud rate; however, it will increase the power dissipation in the dummy resistor resulting in component heating. Also, reducing the value of the capacitor at the output of the rectifier element, i.e., the input capacitor of the DC/DC converter of the receiver, can result in unstable operation of the wireless power transfer system.

Other wireless power transfer systems involve modulating a capacitor at the switch node of the rectifier element instead of a dummy resistive load at the rectifier element's output. This technique may be effective for passive rectifier elements, but for synchronous rectifier element, such as the circuitry 226 described, the off capacitance can detune the zero-voltage-switching (ZVS) of the rectifier element. Detuning of the ZVS may decrease efficiency of the rectifier element resulting in an overall decrease of the power transfer of the system.

As described, the receiver microcontroller 330 may communicate the rectified voltage Vrect using known communication protocols. However, other methods of communicating the rectified voltage Vrect are possible. According to the disclosure, there is provided a method and controller of communicating between a receiver of a wireless power transfer system and a transmitter of the wireless power transfer system, the receiver comprising a synchronous rectifier.

Figure 7:
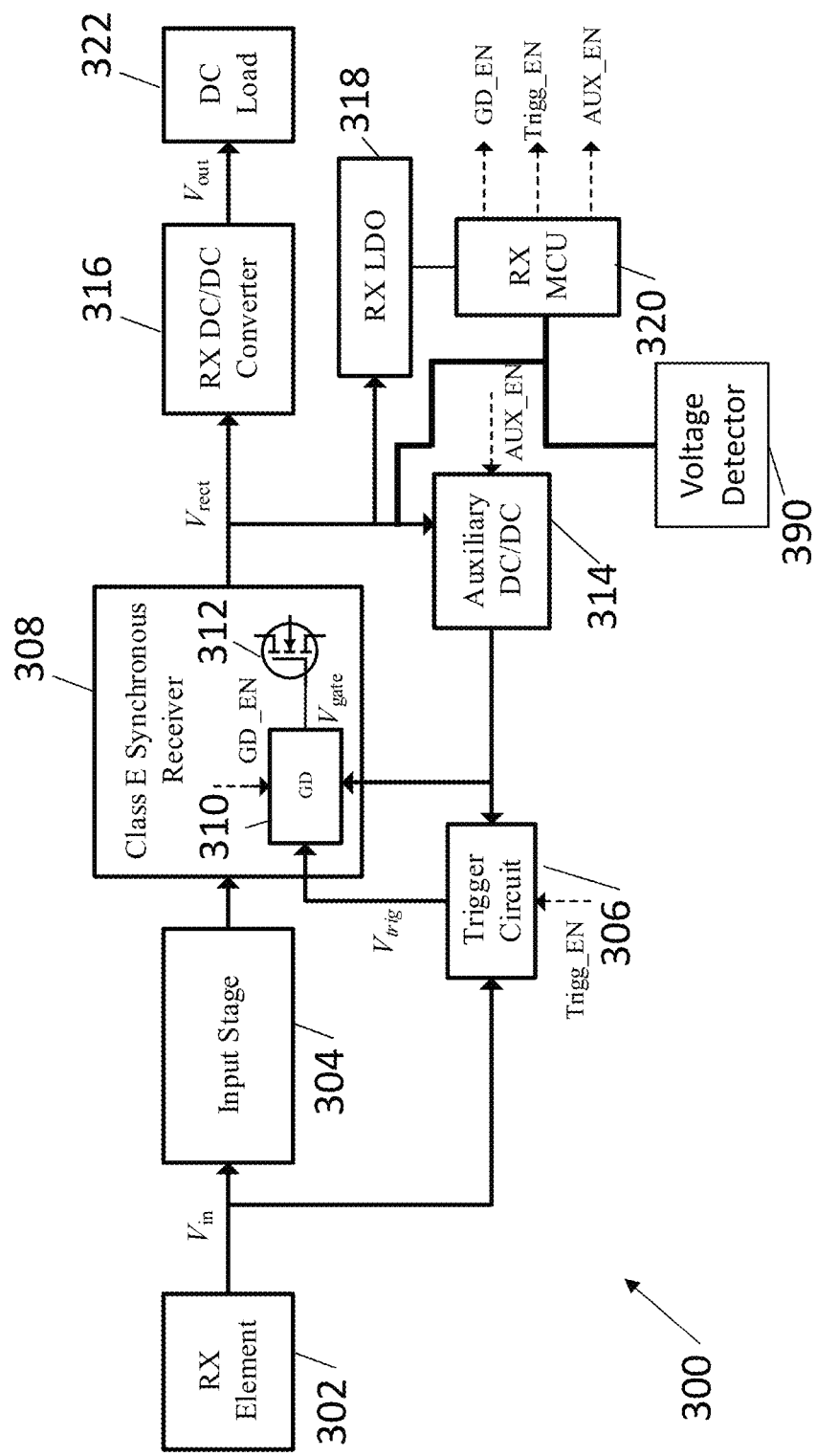
FIG. 7 is a block diagram of a receiver of a wireless power transfer system in accordance with an aspect of the disclosure.

Turning now to FIG. 7 a receiver 300 is illustrated in accordance with an aspect of this disclosure. The receiver 300 comprises a receiver element 302, input stage 304, trigger circuit 306, rectifier element 308 having gate driver 310 and FET 312, auxiliary DC/DC converter 314, DC/DC converter 316 (i.e., primary receiver DC/DC converter), low-dropout (LDO) regulator 318, microcontroller 320 and load 322.

The receiver element 302 is electrically connected to the input stage 304 and trigger circuit 306. The receiver element 302 is the same as receiver element 229 unless otherwise stated. The receiver element 302 extracts wireless power from a field generated by a transmitter of a wireless power transfer system. The voltage extracted or received is represented by Vin.

The input stage 304 is electrically connected to the rectifier element 308, trigger circuit 306 and receive element 302. The input stage 304 is the same as input stage 250 unless otherwise stated.

The rectifier element 308 is electrically connected to the input stage 304, trigger circuit 306, auxiliary DC/DC converter 314, DC/DC converter 316, LDO regulator 318, and microcontroller 320. The rectifier element 308 is the same as the rectifier element 254 unless otherwise stated. In the illustrated arrangement, the gate driver 310 of rectifier element 308 is electrically connected to the microcontroller 320 such that the microcontroller 320 may control operation of the gate driver 310 as will be described.

The trigger circuit 306 is electrically connected to the rectifier element 308, input stage 304, receiver element 302, auxiliary DC/DC converter 314 and microcontroller 320. The trigger circuit 306 is the same as the trigger circuit 252 unless otherwise stated. In the illustrated arrangement, the microcontroller 320 may control operation of the trigger circuit 306 as will be described.

The auxiliary DC/DC converter 314 is electrically connected to the trigger circuit 306, gate driver 310, LDO regulator 318, rectifier element 308, DC/DC converter 316 and microcontroller 320. The auxiliary DC/DC converter 314 is the same as the auxiliary DC/DC converter 258 unless otherwise stated. In the illustrated arrangement, the microcontroller 320 may control operation of the auxiliary DC/DC converter 314 as will be described.

The DC/DC converter 316 is electrically connected to the LDO regulator 318, auxiliary DC/DC converter 314 and rectifier element 308. The DC converter 316 is the same as the DC/DC converter 226 unless otherwise stated.

The load 322 is electrically connected to the DC/DC converter 316. The load 322 is the same as the load 228 unless otherwise stated.

The LDO regulator 318 is electrically connected to the DC/DC converter 316, rectifier element 308 and auxiliary DC/DC converter 314. The LDO regulator 318 is adapted to supply power to the microcontroller 320.

The receiver 300 further comprises a voltage detector 390 electrically connected to a microcontroller 320. The voltage detector 390 detects the rectified voltage Vrect at the output of the rectifier element 308. The detected rectified voltage signal is then transferred to the microcontroller 320 which communicates the rectified voltage signal to the transmitter 210.

In particular, the microcontroller 320 is adapted to selectively modify operation of elements of the receiver 300. Specifically, the microcontroller 320 is adapted to modify operation of a synchronous rectifier, e.g., the rectifier element 308, trigger circuit 306 and auxiliary DC/DC converter 314, of the receiver 300. The microcontroller 320 is adapted to selectively enable and disable the synchronous rectifier to effect a parameter which is detectable at the transmitter. The microcontroller 320 may selectively enable and disable the synchronous rectifier according to a modulation scheme to communicate data to the transmitter. The parameter change may be detected and demodulated, according to the known demodulation scheme, to determine data sent from the receiver 300 to a transmitter of a wireless power transfer which is transferring power to the receiver 300. The microcontroller 320 may operate using a modulation scheme which is known to the transmitter. Alternatively, the microcontroller 320 may communicate the modulation scheme to the transmitter using the described known communication methods. In this way, the microcontroller 320 communicates the rectified voltage signal to a transmitter, e.g., transmitter 210.

The microcontroller 320 receives input data for transmission to the transmitter. Alternatively, the microcontroller 320 may produce its own data for transmission to the transmitter. For example, the microcontroller 320 may include a timer. The microcontroller 320 may be adapted to transmit data, i.e., timer data, from the timer to the transmitter. As such, references to data transmitted to the transmitter may include data received by the microcontroller 320 for transmission, and/or data generated by the microcontroller 320 for transmission.

In the illustrated arrangement, the microcontroller 320 receives input data from the voltage detector 390 which detects the rectified voltage Vrect. As one of skill in the art will appreciate, the microcontroller 320 may receive the rectified voltage Vrect as a direct input for communication to a transmitter. Alternatively or additionally, the microcontroller 320 may receive changes in rectified voltage. The changes in rectified voltage may then be communicated to the transmitter.

The microcontroller 320 is adapted to control operation of the rectifier element 308, trigger circuit 306 and auxiliary DC/DC converter 314 based on the input data, e.g., the rectified voltage. Specifically, the microcontroller 320 controls the amount of time the synchronous rectifier is enabled and disabled thereby encoding data for transmission. The timing may be controlled according to a modulation scheme.

In the illustrated arrangement, the microcontroller 320 comprises a number of outputs, e.g., general purpose input/outputs, which control operation of the auxiliary DC/DC converter 314 which provides power to the gate driver 310 and trigger circuit 306, a comparator, e.g., comparator circuit 264, of the trigger circuit 306, and the gate driver 310. One of skill in the art will appreciate, the microcontroller 320 may only be electrically connected to one of these components in order to toggle operation of the synchronous rectifier.

The microcontroller 320 is adapted to disable operation of any one of these components resulting in the synchronous rectifier being put into a no-load condition. Due to the junction capacitance of a diode in parallel with a main switch of a class E synchronous rectifier of the rectifier element 308, the presented impedance to the receive element 302 will be different compared to synchronous operation. The duty cycle of the diode at the switch node of the rectifier element 308 is close to 100%. This results in sharp changes in the impedance seen by the receive element 302 and consequently by the transmitter wirelessly transferring power to the receiver 300. This sharp change in the output impedance of the transmitter results in instant changes in waveforms at the transmitter that can be decoded to determine data, e.g., the rectified voltage, transmitted from the receiver 300 to the transmitter.

Figure 8:
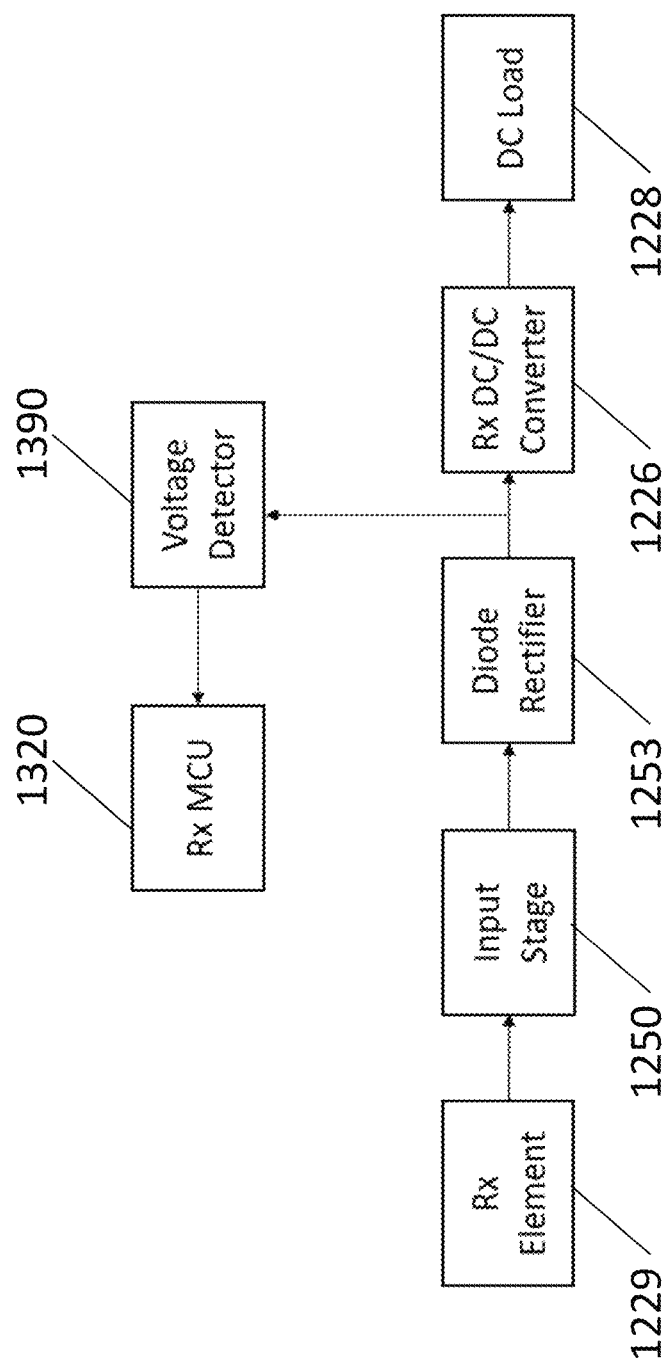
FIG. 8 is a block diagram of a receiver of a wireless power transfer system in accordance with an aspect of the disclosure.

While the receivers 220, 300 have been described as including circuitry which acts as synchronous rectifier, one of skill in the art will appreciate other configurations are possible. For example, the rectifier may be non-synchronous. In particular, the non-synchronous rectifier may comprise a diode rectifier. Turning now to FIG. 8, a block diagram of another arrangement of the receiver is illustrated. In this arrangement, the receiver comprises the same elements as the receiver 220 illustrated in FIG. 4, unless otherwise stated, with similar elements having reference symbols incremented by "1000".

In contrast with the described receivers, in this arrangement, the receiver comprises a diode rectifier 1253. The diode rectifier 1253 is electrically connected to the input stage 1250, receiver DC/DC converter 1226. The voltage detector 1390 detects a rectified voltage at the output of the diode rectifier 1253. The diode rectifier 1253 rectifies the power signal extracted by the receiver element 1229 from a field generated by a transmitter, e.g., transmitter 210. While the illustrated arrangement includes the input stage 1250 and the DC/DC converter 1226, one of skill in the art will appreciate that one, or both, of these elements may not be present.

While not illustrated, the receiver controller 1320 may be powered by a power source at the receiver. For example, the receiver may further comprise an auxiliary DC/DC converter at the output of the diode rectifier 1253 which converts the rectified signal to an appropriate range for powering the receiver controller 1320. The auxiliary DC/DC converter may be electrically connected to the diode rectifier 1253 and the controller 1320.

Similar to the described embodiments, the voltage detector 1390 detects a rectified voltage at the output of the diode rectifier 1253. The receiver controller 1320, which may be in the form of a microcontroller, receives this rectified voltage as an input and communicates the rectified voltage to the transmitter from which the receiver is receiving power wirelessly.

Figure 9:
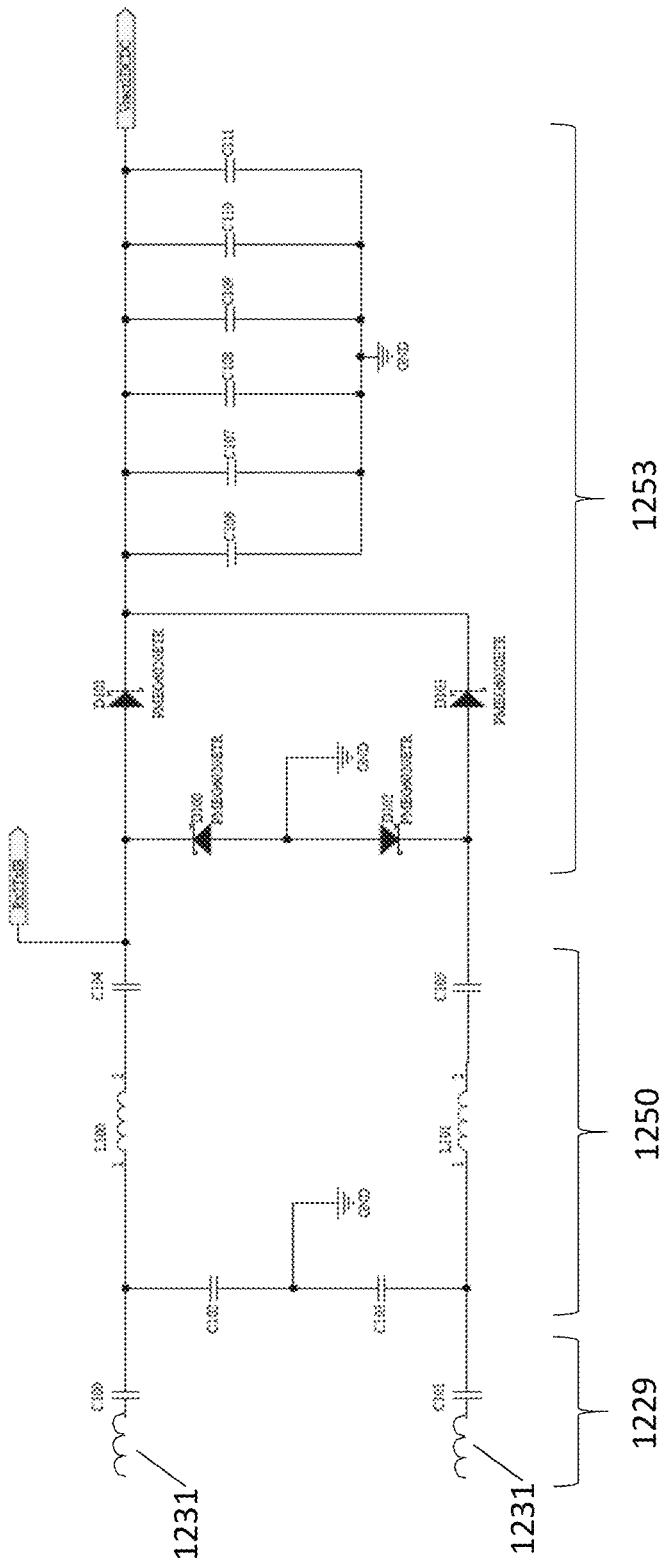
FIG. 9 is a schematic diagram of a portion of the receiver of FIG. 8.

Turning now to FIG. 9, a schematic diagram illustrates the elements of the receiver of FIG. 8 in greater detail. As illustrated, the receiver element 1229 comprises two inductive elements 1231, e.g., coils, electrically connected to capacitors C100, C101. Capacitors C100, C101 are receiver resonator capacitors. In the illustrated arrangement, the receiver element 1229 has been illustrated as comprising two elements, fewer or more may be present. Further, as one of skill in the art will appreciate, the receiver element may comprise capacitive elements, e.g., electrodes, electrically connected to the inductors, i.e., capacitive electrodes and inductor pairs in place of the inductive elements and capacitor pairs. In this arrangement, the receiver would extract power from a generated electric field rather than a magnetic field.

The capacitors C100, C101 are electrically connected to the input stage 1250. The input stage 1250 comprises LC circuits consisting of capacitor/inductor C102/L100 and capacitor/inductor C103/L101 pairs. The capacitors C102, C103 are grounded at a midpoint terminal. The LC circuits perform filtering of high-frequency components from the receiver element 1229 for electromagnetic compatibility (EMC) while allowing the main power signal at the operating frequency of the receiver to pass. Thus, the LC circuits form a single stage LC filter. The input stage 1250 further comprises capacitors C104, C105 to block low frequency components.

Although a single stage LC filter is shown here, one of skill in the art will appreciate that the input stage 1250 may comprise any other topology including a double impedance inverter, a single impedance inverter, or any other filter/matching network. As one of skill in the art will appreciate, the capacitors C104 and C105 are optional and may or may not be included. Additionally, as one of skill in the art will appreciate, the input stage 1250 as a whole may not be included.

The input stage 1250 is electrically connected to the diode rectifier 1253 which comprises diodes D100, D101, D102, and D103 which constitute a full-bridge diode rectifier. The full-bridge diode rectifier is electrically connected to capacitors C106-C111. The capacitors C106-C111 provide output voltage filtering and smoothing. The diode rectifier 1253 converts the alternating current (AC) signal at its input to a direct current (DC) signal at its output.

While not shown in FIG. 9, the output of the diode rectifier 1253 is electrically connected to the DC/DC converter 1226. Further, the voltage detector 1390 detects the rectified voltage at the output of the diode rectifier 1253.

As the diode rectifier 1253 is non-synchronous, there is no synchronous rectifier to toggle to communicate the rectified voltage. Rather in this arrangement, communication between the illustrated receiver and a transmitter is performed by either: toggling a resistor at the output of the diode rectifier 1253, or toggling a capacitor at the input of the diode rectifier 1253 to modulate data onto the main power signal. This toggling is performed by controlling a MOSFET which is connected to either the resistor or capacitor.

Figure 10:
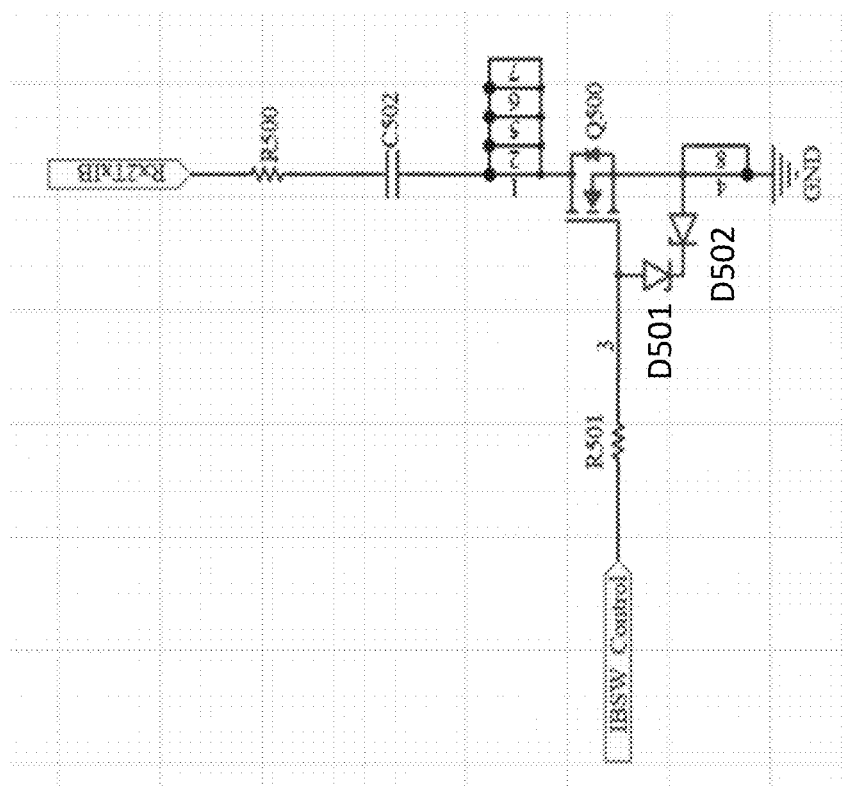
FIG. 10 is a schematic diagram of a further portion of the receiver of FIG. 8.

In the illustrated arrangement, a capacitor is toggled at the input of the diode rectifier 1253. This input connection is illustrated by arrow Rx2TxIB in FIG. 9. Turning to FIG. 10, a circuit diagram of a toggling circuit forming part of the receiver is illustrated. As shown in FIG. 10, a capacitor C502 is connected at the input of the diode rectifier 1253. Resistor R500 is directly connected to the input of the diode rectifier 1253, via node Rx2TxIB. In illustrated arrangement, resistor R500 is a 0 Ohm jumper, although it could also be some non-zero value of resistance. As one of skill in the art will appreciate, the resistor R500 may be omitted. If resistor R500 is not included, capacitor C502 would be connected directly to the input of the diode rectifier 1253.

The IBSW_Control node illustrated in FIG. 10 is electrically connected to the receiver controller 1320. The controller 1320 controls operation of a MOSFET Q500. The receiver controller 1320 is connected to the MOSFET Q500 via resistor R501. While the MOSFET Q500 is illustrated as including diodes D501, D502 connected between pin 3 and 4, 8, one of skill in the art will appreciate these diodes D501, D502 may be omitted. In the illustrated arrangement, resistor R501 is a 0 Ohm jumper, although it could also be some non-zero value of resistance. As one of skill in the art will appreciate, the resistor R501 may be omitted.

In use, the receiver controller 1320 controls operation of the MOSFET Q500 to selectively charge the capacitor C502 electrically connected to an input of the diode rectifier 1253 to modulate data onto the main power signal. The receiver controller 1320 modulates the main power signal to encode the detected rectified voltage for communication with a transmitter.

While the receiver has been described and illustrated in FIGS. 8-10 as communicating the rectified voltage in a certain manner, one of skill in the art will appreciate other configurations are possible. For example, the receiver controller 1320 may comprise a communication module which communicates the rectified voltage to the transmitter via a communication protocol including Bluetooth, Wi-Fi or any other suitable communication protocol.

Figure 11:
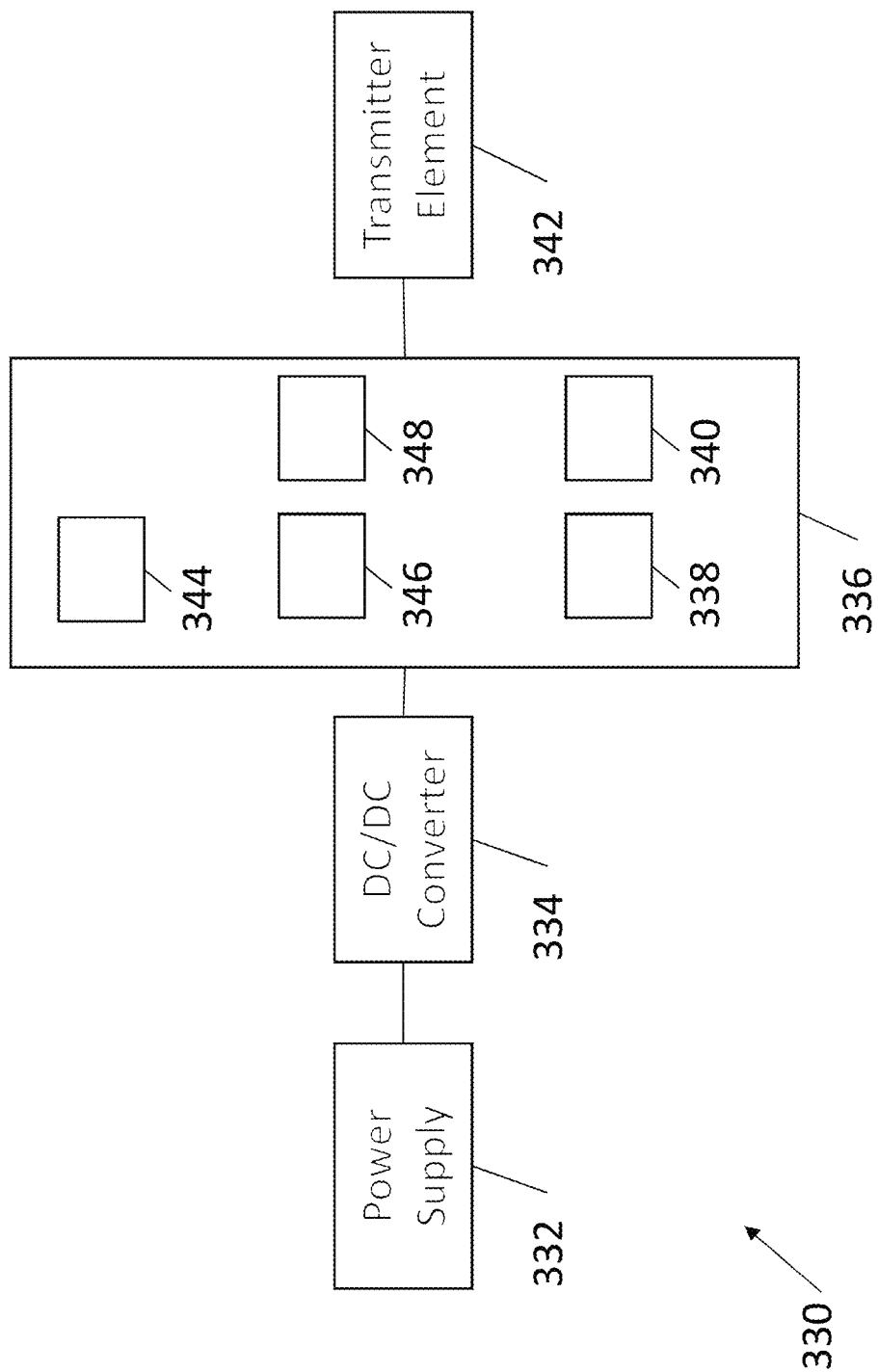
FIG. 11 is a block diagram of a transmitter of a wireless power transfer system in accordance with an aspect of the disclosure.

As described the receiver 300 communicates data, e.g., the rectified voltage, to a transmitter, e.g., the transmitter 210. The transmitter receives the communicated data and controls the output voltage of the DC/DC converter 214. Turning now to FIG. 11, an embodiment of a transmitter 330 in accordance with an aspect of the disclosure is illustrated. The transmitter 330 is adapted for use with the described receiver 300.

The transmitter 330 comprises power supply 332, DC/DC converter 334, circuitry 336 comprising inverter 338 and output stage 340, and transmitter element 342. The power supply 332 is electrically connected to the DC/DC converter 334. The power supply 332 is adapted to supply a power signal to the DC/DC converter 334. The power supply 332 is adapted to supply a DC power signal to the DC/DC converter 334.

The DC/DC converter 334, i.e., the primary transmitter DC/DC converter, is electrically connected to the power supply 332 and the circuitry 336. Specifically, the DC/DC converter 334 is electrically connected to the inverter 338 of the circuitry 336. The DC/DC converter 334 is adapted to convert a power signal received from the power supply 332 to a desired voltage level.

The circuitry 336 is electrically connected to the transmitter element 342 and the DC/DC converter 334. Specifically, the inverter 338 is electrically connected to the DC/DC converter 334 and the output stage 340 is electrically connected to the transmitter element 342. The inverter 338 is also electrically connected to the output stage 340. The inverter 338 is adapted to convert the converted DC power signal from the DC/DC converter 334 to an alternating current (AC) signal. The inverter 338 may comprise a high frequency power inverter. The output stage 340 is adapted to match the output impedance of the inverter 338 to the optimum impedance of the wireless power link between the transmitter element 342 and a corresponding receive element, e.g., receive element 229, 302, 1229. The output stage 340 is additionally or alternatively adapted to filter high frequency harmonic components of the inverter 338. The output stage is additionally or alternatively adapted to establish a quasi-current source behaviour at the connection point of the wireless link.

The transmitter element 342 is electrically connected to the circuitry 336. Specifically, the transmitter element 342 is electrically connected to the output stage 340. The transmitter element 342 comprises one or more inductive elements, i.e., inductors. The inductive elements may comprise one or more coils. The coils may include booster and/or shield coils such as described in applicant's U.S. patent application Ser. No. 17/193,539, the relevant portions of which are incorporated herein by reference.

In another arrangement, the transmitter element 342 comprise one or more capacitive elements, e.g., capacitive electrodes. The capacitive electrodes may be laterally spaced, elongate electrodes; however, one of skill in the art will appreciate that other configurations are possible including, but not limited to, concentric, coplanar, circular, elliptical, disc, etc., electrodes. Other suitable electrode configurations are described in applicant's U.S. Pat. No. 9,979,206B2, the relevant portions of which are incorporated herein by reference. As one of skill in the art will appreciate, the transmitter element 342 may comprise a combination of inductive and capacitive elements.

The transmitter element 342 may generally correspond, e.g., be identical to the receiver element, with the receiver element, e.g., receiver element 229, 302, 1229 to allow for wireless power transfer from the transmitter 330 to the receiver, e.g., receiver 220, 300.

In accordance with an aspect of the disclosure the circuitry 336 further comprises LDO regulator 344, microcontroller 346, and detector 348. The LDO regulator 344 is electrically connected to the DC/DC converter 334, inverter 338 and the microcontroller 346. The LDO regulator 344 is adapted to supply power to the microcontroller 346.

The microcontroller 346 is electrically connected to the LDO regulator 344 and the detector 348. The microcontroller 346 is adapted to decode data transmitted by a receiver to the transmitter 330 based on a parameter change detected by the detector 348. The microcontroller 346 is also electrically connected to the DC/DC converter 334. The microcontroller 346 is adapted to control the output voltage of the DC/DC converter 334 based on decoded data. As the data corresponds to the detected rectified voltage, the microcontroller 346 controls the output voltage of the DC/DC converter 334 based on the communicated (detected) rectified voltage at the receiver 300, specifically at the output of the rectifier element 308 of the receiver 300.

Controlling the output voltage of the DC/DC converter 334 controls the input voltage to the inverter 338. Controlling the input voltage to the inverter 338 may alter the field generated by the transmitter 342 element. As described, changes to the medium 332 may negatively impact average power transfer efficiency between the transmitter 330 and receiver 300. These changes are observable via the rectified voltage at the receiver 300 which is communicated to the transmitter 330. The transmitter 330 controls the inverter 338 input voltage to alter the strength of the generated field thereby improving the average power transfer efficiency to the receiver 300.

The detector 348 is electrically connected to the output stage 340, or the DC/DC converter 334 and inverter 338. The detector is adapted to detect a change in a parameter at the transmitter 330 as will be described.

The output voltage of the DC/DC converter 334 may be changed from a first voltage level to a second voltage based on the rectified voltage. The controller 320 may monitor the rectified voltage Vrect via the voltage detector 390 over a time period. If rectified voltage Vrect changes significantly enough in a short enough time, the controller 320 communicates the new rectified voltage Vrect to the transmitter 330 by varying synchronous operation as described to change the output voltage to the second level. For example, if the rectified voltage Vrect goes down 4V in 1 s, the controller 346 may make a decision to increase the DC/DC converter 334 output voltage (the inverter 338 input voltage). If the rectified voltage Vrect goes up by a similar amount in a similar time frame, the controller 346 may make a decision to control the DC/DC converter 334 to lower its output voltage (the inverter 338 input voltage).

The decision making by the controller 346 is based on the relationship of the inverter 338 input voltage (the output voltage of the DC/DC converter 334) and the rectified voltage. If the rectified voltage is higher than expected, it may indicate the receiver 300 is closer to the transmitter 330 than expected, i.e., the separation distance has decreased, the medium 232 has reduced thickness or width. Alternatively, if the rectified voltage is lower than expected, it may indicate the receiver 330 is farther from the transmitter 310 than expected. The expected rectified voltage may be the rectified voltage at which the receiver 220 is operating. The rectified voltage may be higher than expected as a result of changes in the medium other than distance, such as composition. For example, if the system 200 is operating through a medium comprising glass, but then moved to operate through a medium comprising wood, the rectified voltage may decrease.

Once a controller 346 receives the rectified voltage from the controller 320 at the receiver (via the described synchronous operation toggling), the controller 346 may initiate an optimization sequence. In the sequence, the inverter 338 input voltage (DC/DC converter 334 output voltage) is increased based on the received rectified voltage. For example, the initial input voltage may be 10 V. This voltage is used to generate a field at the transmitter element 342. The rectified voltage at the receiver 300 which is related to power extracted from the generated field is communicated to the transmitter 330. The controller 346 then makes a decision whether to increase or decrease the input voltage. This decision could be to go to a higher inverter 338 input voltage if the rectified voltage Vrect is within an acceptable range (determined via experimentation) or turn the wireless power transfer system off/re-start optimization if the rectified voltage Vrect is either too high or too low. Turning the system off, may mean dropping the input voltage to 0 V such that no field is generated.

If the rectified voltage Vrect is too high, the receiver 300 may be too close to the transmitter 330. A high rectified voltage Vrect at the output of the rectifier element 308 may damage electrical components at the receiver 300, e.g., diodes. Thus, the input voltage will have to stay low to prevent damage which may affect the switch-node tuning at the receiver 300 negatively.

If the rectified voltage Vrect is too low, the receiver 300 may be too far away from the transmitter 330. In this instance, not enough power may be extracted to power the load 332 of the receiver 300, or the current into the rectifier element of the receiver 300 may be too high (because the voltage is low) which could result in excess heating at the receiver 300, or unstable power transfer.

Figure 12:
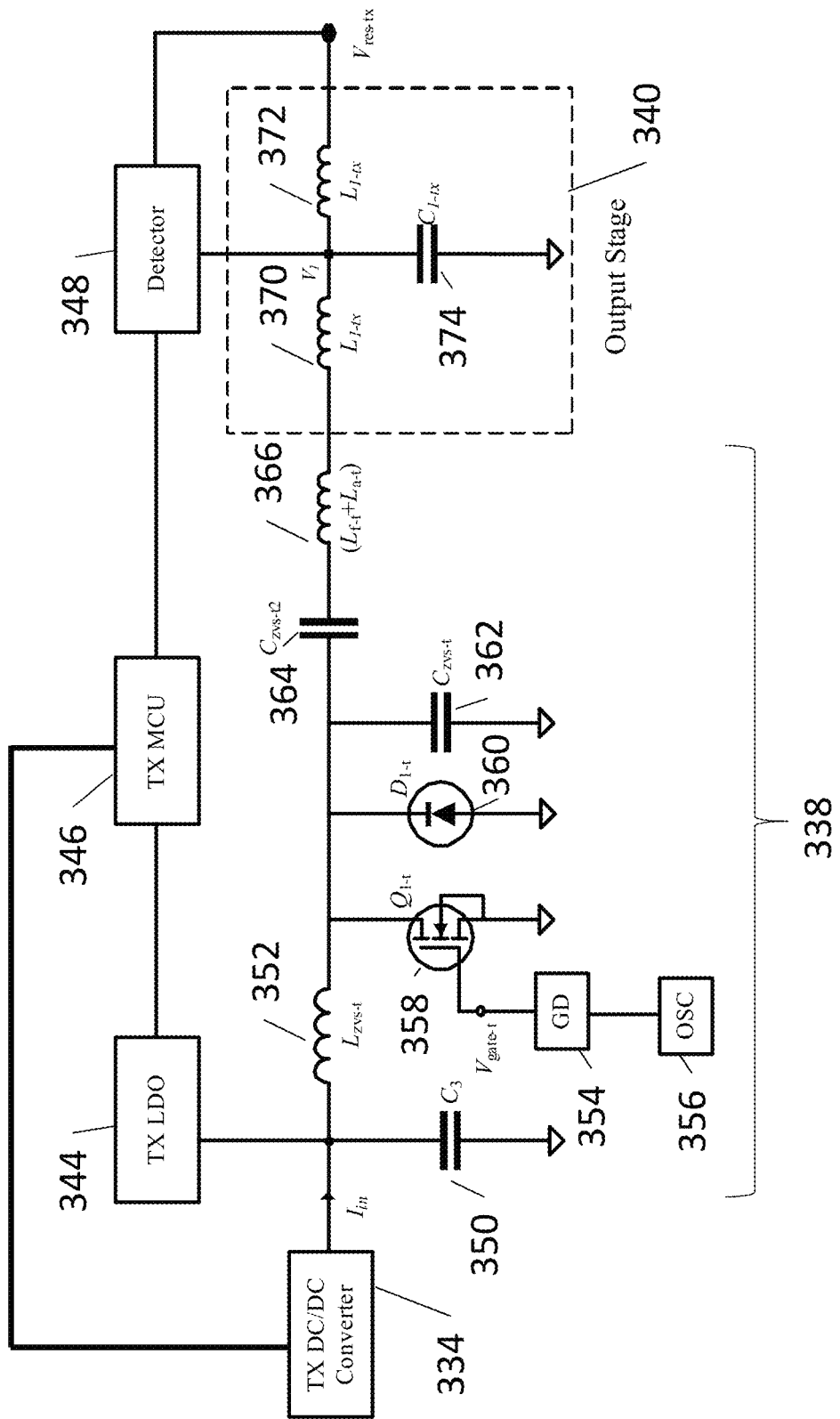
FIG. 12 is a schematic diagram of a portion of the transmitter of FIG. 11.

The microcontroller 346 and detector 348 shall be described in greater detail with reference to FIG. 12. A portion of an embodiment of the transmitter 330 is illustrated in greater detail in FIG. 12. In the illustrated arrangement, the LDO regulator 344 is powered by the DC/DC converter 334 and powers the microcontroller 346. The microcontroller 346 receives a signal from the detector 348. The detector 348 outputs a logic level signal, i.e., logic levels, which the microcontroller 346 decodes into data transmitted by a receiver to the transmitter 330.

While the LDO regulator 344 has been described as being powered by the DC/DC converter 334, one of skill in the art will appreciate other configurations are possible. For example, the LDO regulator 344 may be connected to a power source, e.g., mains power supply, which powers the DC/DC converter 334. Alternatively, the LDO regulator 344 may be powered by an auxiliary DC/DC converter which is connected to the power source.

In the illustrated arrangement, the detector 348 detects a voltage waveform, i.e., the detector 348 is a voltage detector. The detector 348 detects a voltage waveform based on variations in voltage at two nodes, e.g., V1 at an intermediate point of the output stage 340 and Vres-tx at an output of the output stage 340. While the detector 348 is described as detecting a voltage waveform based on variations in voltage at two nodes, one of skill in the art will appreciate the detector 348 may be connected to only a single node. For example, the detector 348 may detect a voltage waveform based on variations in voltage Vres-tx at the output of the output stage 340.

In the illustrated arrangement, the inverter 338 comprises capacitor 350, inductor 352, gate driver 354, clock generator 356, main switch 358, diode 360, capacitor 362, capacitor 364, and inductor 366. The capacitor 350 having capacitance C3 is connected in parallel to the DC/DC converter 334, and in parallel with the series combination of the inductor 352 having inductance LZVS-t and main switch 358 indicated as Q1-t. In the illustrated arrangement, the main switch 358 comprises an n-type MOSFET. While an n-type MOSFET has been illustrated, one of skill in the art will appreciate other FETs and switching devices may be used.

The main switch 358 is electrically connected to the gate driver 354 which is electrically connected to the clock generator 356. The gate driver 354 drives the main switch 358 of the inverter 338. The clock generator 356 is electrically connected to the gate driver 354. The clock generator 356 comprises an oscillator. One of skill in the art will appreciate the clock generator 356 may comprise any signal generator.

The clock generator 356 is configured to generate a clock signal to control the gate driver 354 connected to the main switch 358 to invert the inputted power signal from the power source 332 (via the DC/DC converter 334) to an RF or AC signal.

The inverter 338 further comprises a diode 360 indicated as D1-t electrically connected in parallel to the main switch 358, and the capacitor 362 having a capacitance CZVS-t electrically connected in parallel to the diode 360. The capacitor 362 is electrically connected to the capacitor 364 having a capacitance CZVS-t2 which is electrically connected in series to the inductor 366 having the inductance Lf-t+La-t. The main switch 358, diode 360 and capacitor 362 are connected in parallel between inductor 352 and capacitor 364.

In the illustrated arrangement, the output stage 340 comprises inductor 370 having inductance L1-tx electrically connected in series to inductor 372 having inductance L1-tx with capacitor 374 having capacitance C1-tx electrically connected between the shared node of the inductors 370, 372 and return.

As described, the detector 348 detects a voltage waveform based on variations in voltage at at least one of two nodes, e.g., V1 at an intermediate point of the output stage 340 and Vres-tx at an output of the output stage 340. The detector 348 outputs a logic level signal, i.e., logic levels, which the microcontroller 346 decodes into data transmitted by a receiver to the transmitter 330, e.g., the rectified voltage at the output of the rectifier element 308 of the receiver 300.

The detector 348 is electrically connected to the transmitter DC/DC converter 334. Specifically, the detector 348 is adapted to output a control signal to the DC/DC converter 334 based on the decoded data, e.g., the rectified voltage, to control the output voltage of the DC/DC converter 334. Controlling the output voltage of the DC/DC converter 334 controls, via the inverter 338, the strength of the field generated by the transmitter element 342 of the transmitter 330.

Figure 13:
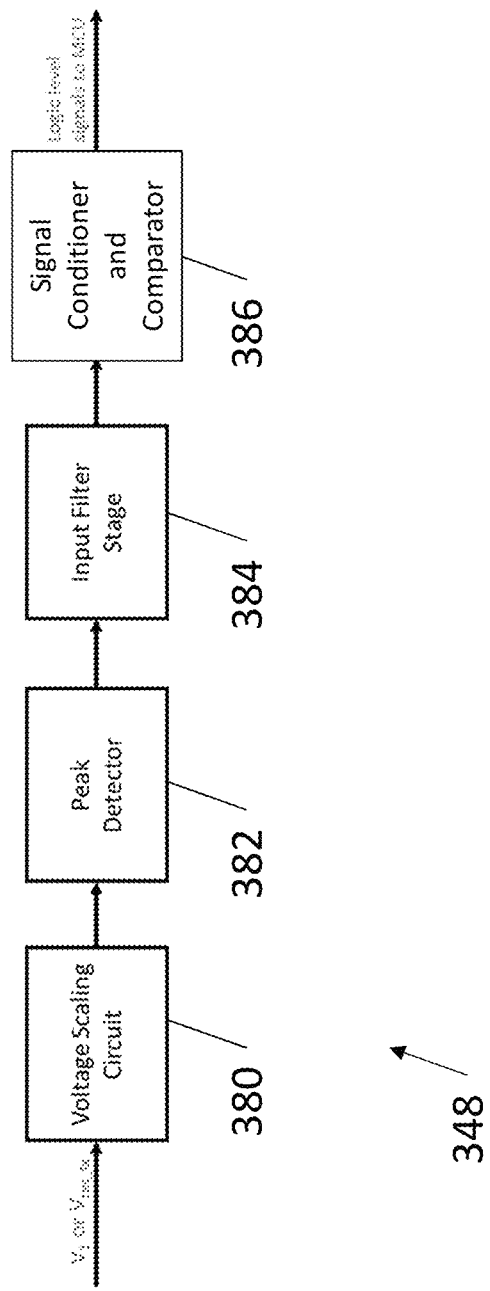
FIG. 13 is a block diagram of a detector of the transmitter of FIG. 11.

Turning now to FIG. 13, the detector 348 is illustrated in greater detail. The detector 348 demodulates the voltage waveform detected at the transmitter. In other words, the detector 348 comprises a voltage demodulator. The detector 348 comprises scaling circuit 380, peak detector 382, filter 384, and signal conditioner and comparator 386.

In operation, the scaling circuit 380 receives the detected waveforms, e.g., V1 and Vres-tx. The scaling circuit 380 reduces an amplitude of the detected waveforms in order to more easily process the waveforms. The amplitude reduced waveforms are then fed to the peak detector 382 which converts the signals into a DC voltage. When a sudden change in the RF signal input to the peak detector 382 occurs as a result of the receiver toggling operation of the synchronous rectifier, the signal output from the peak detector 382 changes in proportion. The filter 384, i.e., input filter stage, filters this output. For example, the filter 384 filters this change while blocking unwanted signal components such as high frequency noise and DC offset. The filtered signal then passes through the signal conditioner and comparator 386. The signal conditioner and comparator 386 amplifies and then compares the amplified against a reference level. The signal conditioner and comparator 386 may comprises a comparator. The signal conditioner and comparator 386 outputs a logic level signal whenever a sufficiently large modulation in the RF input voltage signals occurs.

The output logic level signal is then provided to the microcontroller 346 for decoding. The microcontroller 346 determines time between the modulated pulses to decode/demodulate the logic level signal in a binary sequence representing data transmitter from a receiver to the transmitter 330.

This is similar to the process undertaken at the receive microcontroller 320 which receives or generate data for transmission to the transmitter, e.g., transmitter 330. Similar to transmit microcontroller 346, receive microcontroller 320 encodes the data to be transmitted into a time sequence of synchronous and non-synchronous operation of the synchronous rectifier which results in the change in the waveform detected at the transmitter.

Figure 14:
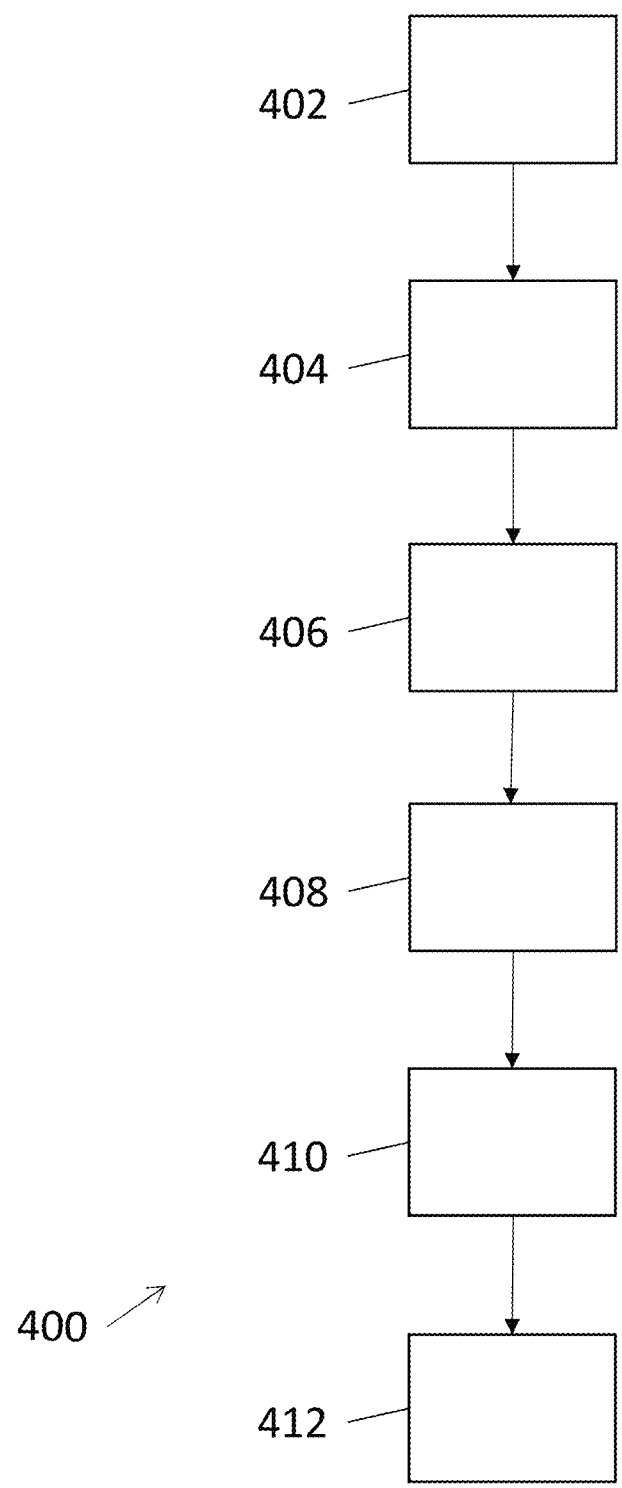
FIG. 14 is a flowchart of a method of wireless power transfer through a medium in accordance with an aspect of the disclosure.

Turning now to FIG. 14, a flowchart illustrated a method 400 of wireless power transfer through a medium, e.g., medium 332, between a receiver, e.g., receiver 300, and a transmitter, e.g., transmitter 330, is illustrated. The method 400 comprises detecting 402, via the voltage detector 390 of the receiver 200, 300, rectified voltage at an output of the rectifier element 254, 308 of the receiver 200, 300. The detecting 402 may be directly by the microcontroller 320 at the receiver 200, 300.

The method 400 further comprises communicating 404, via the controller 320, the detected rectified voltage to a transmitter, e.g., transmitter 210, 330. The controller 320 may communicate the rectified voltage using conventional communication protocols, e.g., Wi-Fi, Bluetooth.

Alternatively, the controller 320 may communicate the rectified voltage by toggling synchronous operation of the rectifier element 308 in the manner described. Further, the controller 320 may communicate by controlling a MOSFET to toggle a resistor at the output of the diode rectifier 1253, or toggling a capacitor at the input of the diode rectifier 1253 to modulate data onto the main power signal as described.

In this instance, the method 400 may further comprise encoding the detected rectified voltage into a time sequence for modifying operation of a synchronous rectifier. The method 400 may further comprise modifying operation may comprise selectively enabling and/or disabling operation of the gate driver 310, trigger circuit 306 and/or auxiliary DC/DC converter 314. Such selective toggling of components of the synchronous rectifier is performed according to the encoded rectified voltage to be transmitted such that the resulting parameter change at the transmitter 330 is indicative of the rectified voltage to be communicated from the receiver 300 to the transmitter 330.

The method 400 further comprises detecting 406 a parameter change at the transmitter 330 based on a modification of the operation of the synchronous rectifier. As described the detector 348 detects voltage waveforms at the transmitter 330 based on the modification of the operation of the synchronous rectifier.

The method 400 further comprises determining 408 data, e.g., the rectified voltage, communicated from the receiver 300 to the transmitter 330 based on the parameter change, i.e., the detected parameter change. As described the detector 348 processes the detected waveforms and compares the processed waveforms with levels to produce a logic level signal which is decoded into data transmitted from the receiver 300 to the transmitter 330.

Such a method of communicating data may be more efficient than existing methods while allowing for higher data transfer rates. Further such a method may be operational with a receiver comprising a synchronous rectifier by selectively toggling operation of the synchronous rectifier to communicate data to a transmitter from which the receiver is extracting power.

The method may further comprise controlling 410, via the controller 346 of the transmitter 330, an output voltage of a DC/DC converter 334 electrically connected the inverter 338 of the transmitter 330 based on the detected rectified voltage. By controlling the output voltage, change in the medium which are observable via changes in the rectified voltage can be accounted for by controlling the output voltage to improve the average power transfer efficiency between the transmitter 330 and receiver 300.

The method may further comprise generating 412, via a transmit resonator of the transmitter, i.e., the transmitter element 224, 342, of the transmitter 210, 330, a field for transferring power wirelessly through a medium to the receiver 220, 300. The strength of the field is based on the output voltage of the converter 214, 334 (the input voltage of the inverter 216, 338).

An experimental setup of the receiver 300 and transmitter 330 was tested to assess performance. To emulate the presence of a fixed coupling wireless link between the transmitter 330 and receiver 300, an equivalent T-network was used to connect the transmitter 330 and receiver 300 in the experimental setup. In order to toggle the receiver 300 between synchronous and non-synchronous operation a function generator was used enable/disable the auxiliary DC/DC converter 314 of the receiver 300 which powers the synchronous rectifier's gate driver 310. All tests were carried under no-load at the receiver 300. Operation of the receiver 300 and transmitter 330 may be conducted under loading conditions at the receiver 300. The experimental setup transferred power from the transmitter 330 to the receive 300 using primarily magnetic field coupling. Further, the experimental setup had an operating frequency of 13.56 MHZ.

The transmitter RF voltage V1 as well as the transmitter current Iin were measured while the synchronous rectifier was modulated between synchronous and non-synchronous operation. The results of this testing are illustrated in FIGS. 15 to 19.

Figure 15:
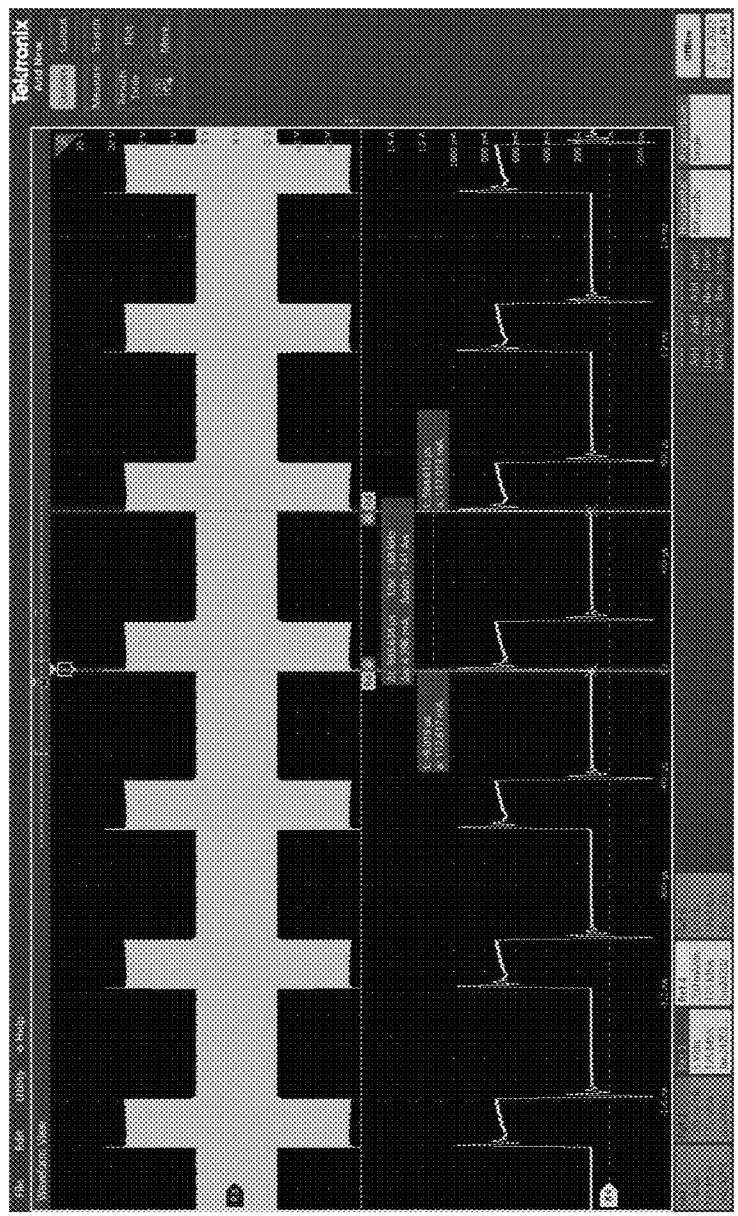
FIG. 15 is a graph of voltage and current waveforms of a transmitter in accordance with an aspect of the disclosure.

FIG. 15 is a graph of voltage and current waveforms of the transmitter 330. FIG. 15 illustrates the response of these voltage and current waveforms when the receiver 300 was modulated at a frequency of 1700 Hz. As illustrated, the voltage waveforms range from +18 V to −18 V with peaks at +18 V and −18 V, and trough at +6 V and −6 V. The current waveforms range from almost 1000 mA to a stead state of approximately 112-117 mA.

Figure 16:
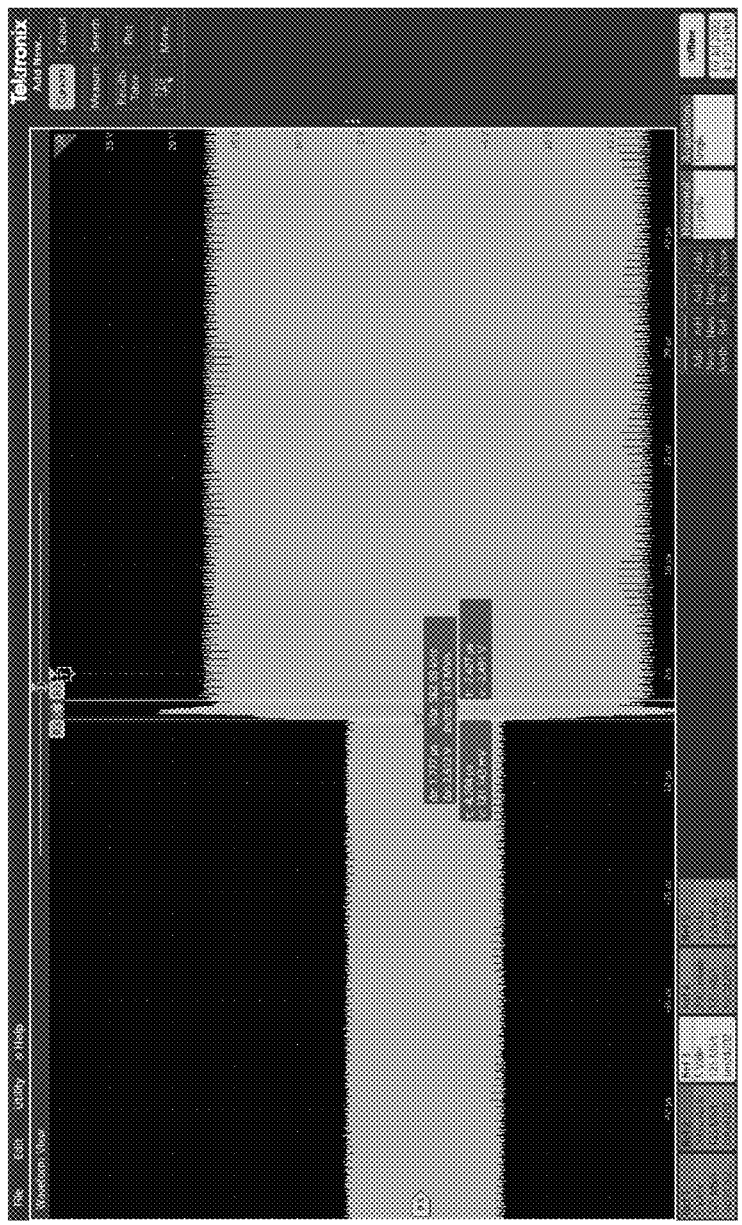
FIG. 16 is a graph of voltage rise time of a transmitter in accordance with an aspect of the disclosure.

FIG. 16 is a graph of voltage rise time of the transmitter 330 for an exemplary period of the voltage waveform. As illustrated in FIG. 16, during the rise time of 1.777 us the waveform exhibits a sharp increase in voltage of 2.612 V.

Figure 17:
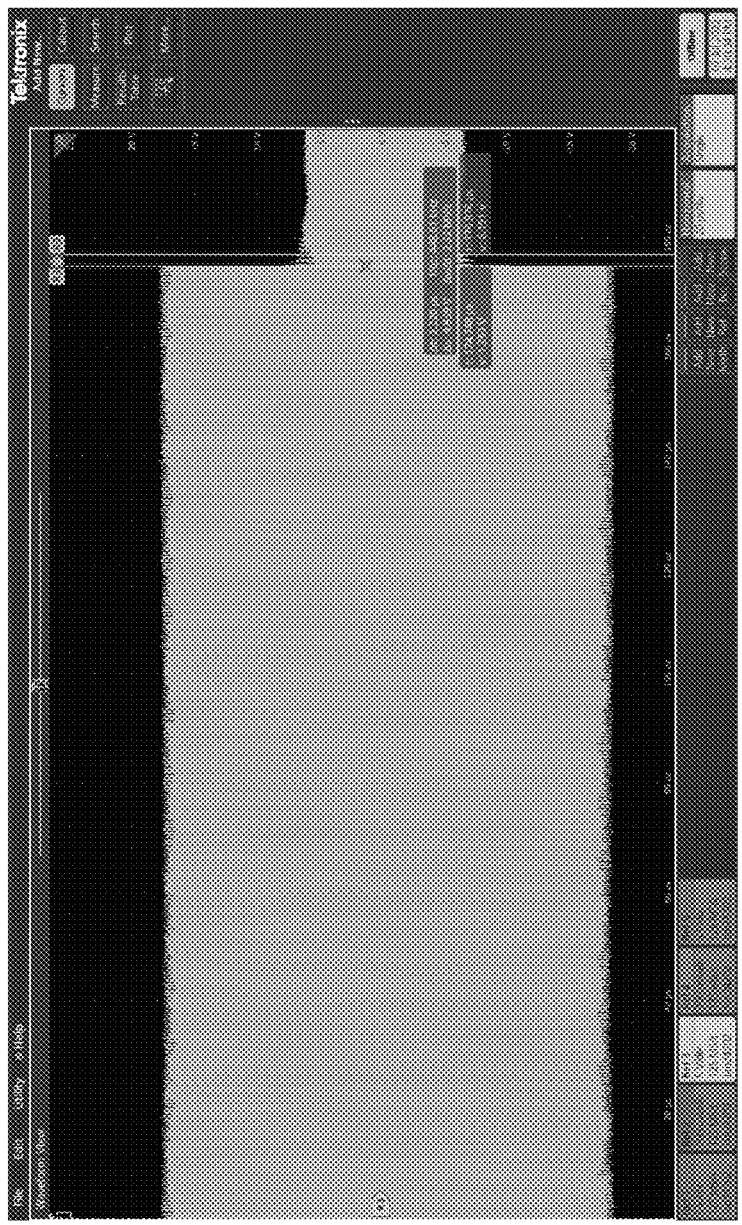
FIG. 17 is a graph of voltage fall time of a transmitter in accordance with an aspect of the disclosure.

FIG. 17 is a graph of voltage fall time of the transmitter 330 for an exemplary period of the voltage waveform. As illustrated in FIG. 17, during the fall time of 2.228 us the waveform exhibits a sharp decrease in voltage of 4.939 V.

Figure 18:
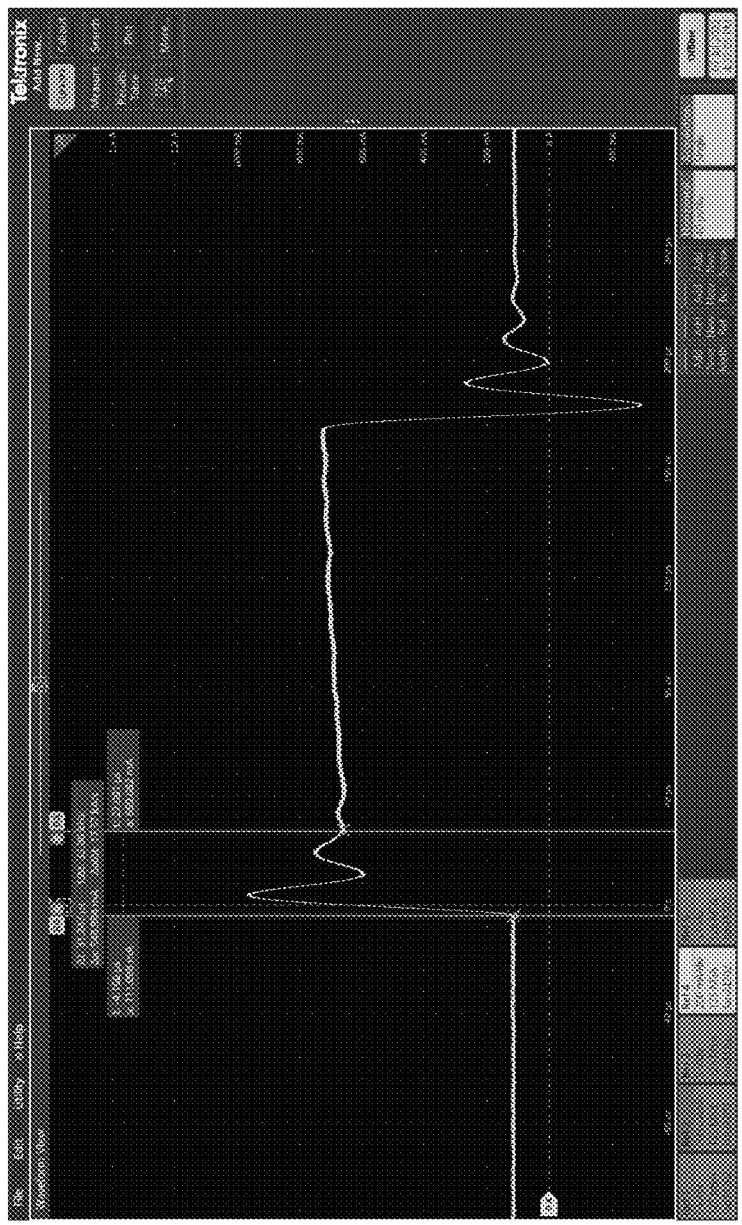
FIG. 18 is a graph of current rise time of a transmitter in accordance with an aspect of the disclosure.

FIG. 18 is a graph of current rise time of the transmitter 330 for an exemplary period of the current waveform. As illustrated in FIG. 18, during the rise time of 31.247 us the waveform exhibits an increase in current of 548.984 mA.

Figure 19:
FIG. 19 is a graph of current fall time of a transmitter in accordance with an aspect of the disclosure.

FIG. 19 is a graph of current fall time of the transmitter 330 for an exemplary period of the current waveform. As illustrated in FIG. 19, during the fall time of 46.633 us the waveform exhibits a sharp decrease in current of 612.376 mA.

These graphs illustrate that changes in the voltage and current waveforms are detectable based on changes in operation of the synchronous rectifier in order to communicate data from the receiver to the transmitter.

Figure 20:
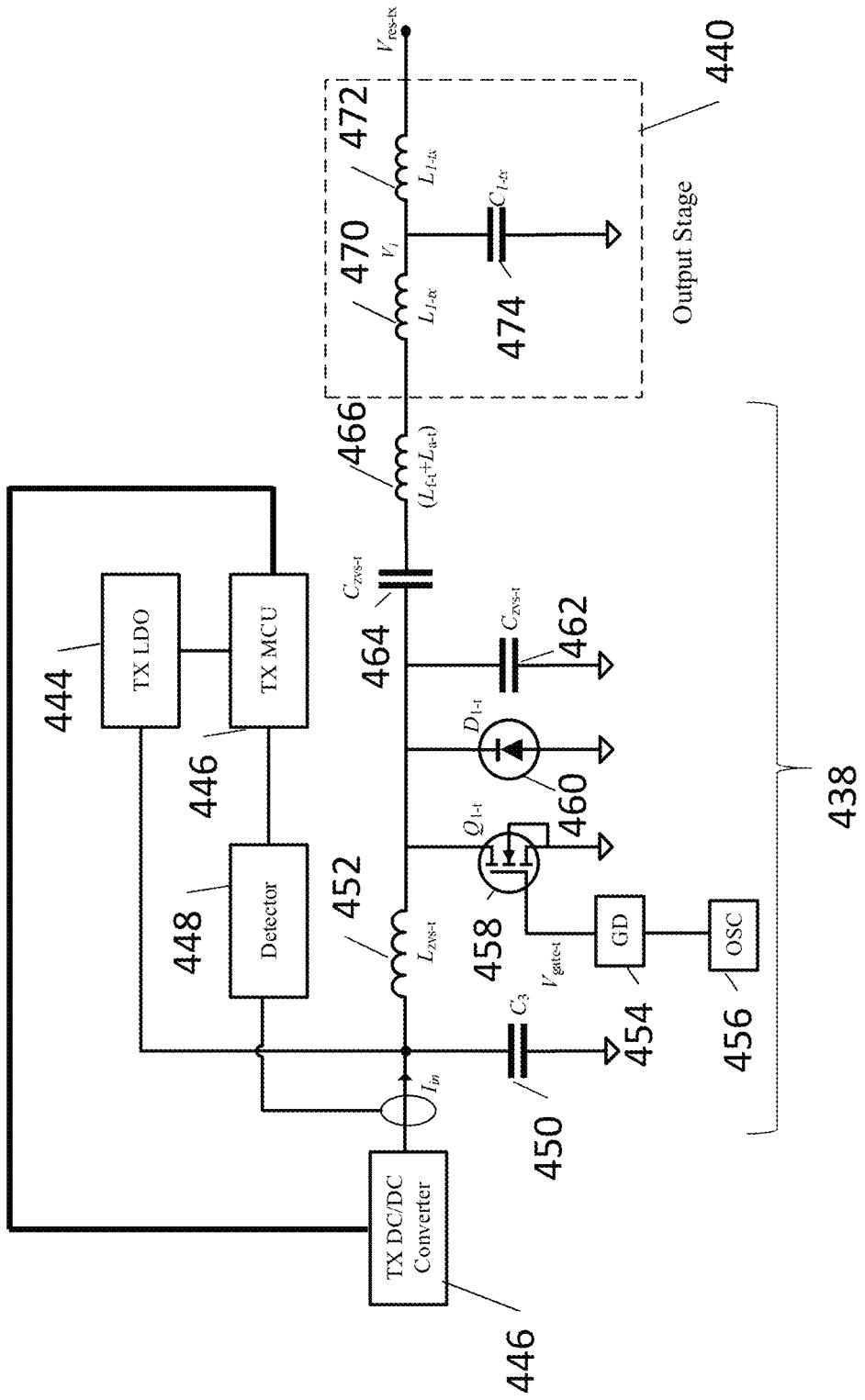
FIG. 20 is a schematic diagram of a portion of a transmitter in accordance with an aspect of the disclosure.

While a particular transmitter 330 is described, one of skill in the art will appreciate that other configurations are possible. Turning now to FIG. 20 another embodiment of a portion of a transmitter is illustrated. In this embodiment, the transmitter comprises like components of transmitter 330 with identical elements having reference symbols incremented by 100. The LDO regulator 444 is powered by the DC/DC converter 434 and powers the controller 446. The controller 446 receives a signal from the detector 448. The detector 448 outputs a logic level signal, i.e., logic levels, which the controller 446 decodes into data transmitted by a receiver to the transmitter.

In the illustrated arrangement, the detector 448 detects one or more current waveforms, i.e., the detector 448 is a current detector. The detector 448 detects a current waveform based on variations in current at a single node, e.g., Iin at an output of the DC/DC converter 434.

Since the input DC current of the transmitter changes according to the seen impedance, this signal, i.e., Iin, may alternatively or additionally be used as the source to a detector 448, e.g., current demodulator, which filters the detected DC current and generates logic-level message to reflect the variation in the DC current level of the transmitter. This signal is then transferred to the controller 446, e.g., microcontroller. The controller 446 then controls the output voltage of the DC/DC converter 434 of the transmitter based on the decoded rectified voltage of the receiver.

Figure 21:
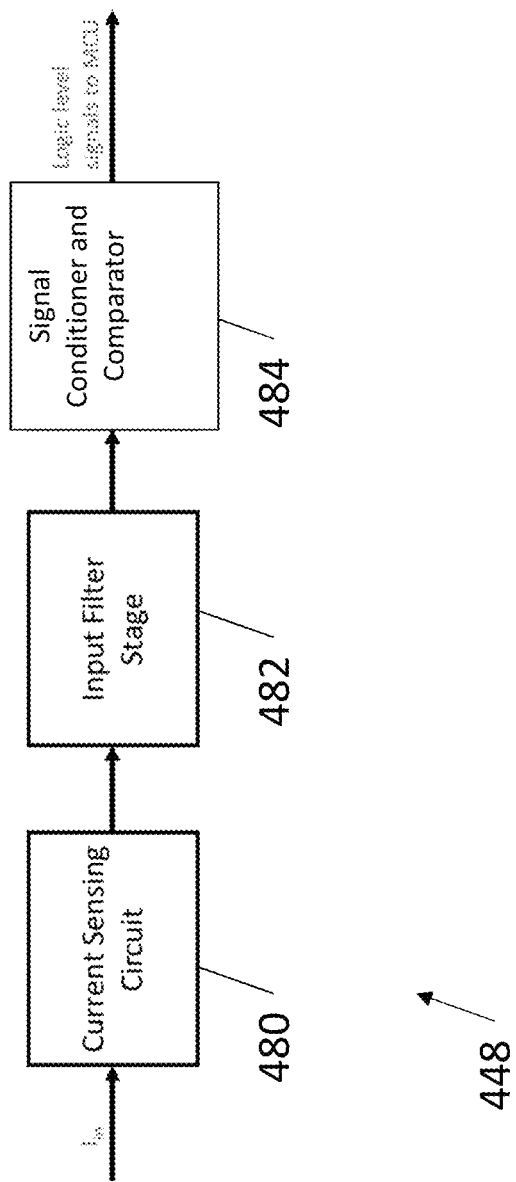
FIG. 21 is a block diagram of a current demodulator of the transmitter of FIG. 20.

Turning now to FIG. 21, the detector 448, i.e., current detector, is illustrated in greater detail. The detector 448 demodulates the current waveform detected at the transmitter as will be described. In other words, the detector 448 comprises a current demodulator. The detector 448 comprises current sensing circuit 480, filter 482, and signal conditioner and comparator 484.

In operation, the current sensing circuit 480 detects the current signal, e.g., input current Iin. The current sensing circuit 480 additionally scales the sensed current to a smaller amplitude. The current sensing circuit 480 additionally converts the sensed current, e.g., the scaled sensed current, into a voltage signal proportional to the sensed current. The filter 428, i.e., input filter stage, filters this output, i.e., the converted voltage. For example, the filter 428 passes the modulated signal while blocking unwanted signal components such as high frequency noise and DC offset. The filtered signal then passes through the signal conditioner and comparator 484. The signal conditioner and comparator 484 amplifies and then compares the amplified against a reference level. The signal conditioner and comparator 484 may comprise a comparator. The signal conditioner and comparator 484 outputs a logic level signal whenever a sufficiently large modulation in the input current Iin signal occurs.

The output logic level signal is then provided to the controller 446 for decoding. The controller 446 determines time between the modulated pulses to decode the logic level signal in a binary sequence representing data transmitted from a receiver to the transmitter. The data is the rectified voltage detected at the receiver which is used to control operation of the DC/DC converter 434.

It should be understood that the examples provided are merely exemplary of the present disclosure, and that various modifications may be made thereto.

The invention claimed is:

1. A method of wireless power transfer through a medium, the method comprising:
controlling an input voltage of an inverter of a transmitter of a wireless power transfer system based on a detected parameter; and
generating, via a transmit resonator of the transmitter, the transmit resonator electrically connected to the inverter, a field for transferring power wirelessly through a medium to a receiver of the wireless power transfer system.

2. The method of claim 1, further comprising:
detecting the parameter at the transmitter and/or the receiver of the wireless power transfer system.

3. The method of claim 2, wherein the parameter comprises rectified voltage at the receiver of the wireless power transfer system.

4. The method of claim 1, wherein controlling an input voltage of an inverter comprises:
controlling an output voltage of a converter electrically connected to the inverter.

5. The method of claim 1, further comprising:
communicating the detected parameter to the transmitter.

6. The method of claim 5, wherein communicating comprises:
communicating the detected parameter from the receiver to the transmitter.

7. The method of claim 1, further comprising:
monitoring the parameter over a period of time.

8. The method of claim 7, wherein controlling an input voltage of an inverter comprises:
controlling an input voltage of an inverter based on a change to the monitored parameter over the period of time.

9. The method of claim 1, wherein the medium comprises a window, glass, a building structure, concrete or wood.

10. A method of wireless power transfer through a medium, the method comprising:
powering, via an inverter, a transmit resonator of a transmitter of a wireless power transfer system at an input voltage via an inverter to generate a field for transferring power wirelessly through a medium to a receiver of the wireless power transfer system; and
optimising the input voltage of the inverter based on a detected parameter.

11. The method of claim 10, wherein optimising the input voltage comprises adjusting the input voltage from a first voltage level to a second voltage level based on the detected parameter.

12. The method of claim 10, wherein adjusting the input voltage comprises continuously adjusting the input voltage between a plurality of voltage levels.

13. The method of claim 10, further comprising:
    detecting the parameter at the transmitter and/or the receiver of the wireless power transfer system.

14. The method of claim 10, wherein the parameter comprises rectified voltage at the receiver of the wireless power transfer system.

15. The method of claim 10, further comprising:
    communicating, from the receiver, the rectified voltage to the transmitter.

16. A controller configured to control at least one of an inverter of an transmitter of a wireless power transfer system, a converter of the transmitter, the transmitter and a receiver of the wireless power transfer system to perform the method of claim 1.

17. A transmitter of a wireless power transfer system, the transmitter for wirelessly transferring power through a medium to a receiver of the wireless power transfer system, the transmitter comprising:
    a transmit resonator for wirelessly transferring power through a medium to a receiver of the wireless power transfer system;
    an inverter electrically connected to the transmit resonator; and
    a controller for controlling an input voltage of the inverter based on a detected parameter.

18. The transmitter of claim 17, further comprising:
    a sensor for detecting the parameter at the transmitter and/or receiver.

19. The transmitter of claim 17, wherein the parameter comprises rectified voltage at the receiver of the wireless power transfer system.

20. The transmitter of claim 17, further comprising:
    a communication module for receiving the parameter from a receiver of the wireless power transfer system.

\* \* \* \* \*